United States Patent
Batdorf et al.

(10) Patent No.: US 6,355,904 B1
(45) Date of Patent: Mar. 12, 2002

(54) METHOD AND SYSTEM FOR HIGH-TEMPERATURE WASTE TREATMENT

(75) Inventors: James A. Batdorf; John D. Dalton; Raymond M. Geimer; Robert L. Gillins; Milo M. Larsen; Gary L. Leatherman; Steven D. Poling; William P. Wolfe, all of Idaho Falls, ID (US)

(73) Assignee: Science Applications International Corporation, San Diego, CA (US)

( * ) Notice: Subject to any disclaimer, the term of this patent is extended or adjusted under 35 U.S.C. 154(b) by 351 days.

(21) Appl. No.: 08/661,413

(22) Filed: Jun. 7, 1996

(51) Int. Cl.[7] ............................................... B23K 10/00
(52) U.S. Cl. ........................... 219/121.59; 219/121.48; 219/121.36; 219/121.37; 219/121.38; 373/18; 588/900; 110/346
(58) Field of Search ........................ 219/121.36, 121.48, 219/121.43, 121.59, 121.37, 121.38; 373/18–22; 588/900; 110/242–245, 346

(56) References Cited

U.S. PATENT DOCUMENTS

| | | | |
|---|---|---|---|
| 3,630,368 A | * 12/1971 | Lee ............................. | 210/181 |
| 3,841,239 A | 10/1974 | Nakamura et al. | |
| 3,999,979 A | * 12/1976 | Outhwaite et al. ............. | 75/58 |
| 4,181,504 A | 1/1980 | Camacho | |
| 4,204,082 A | 5/1980 | Stenkvist | |
| 4,228,314 A | 10/1980 | Stenkvist | |
| 4,324,943 A | 4/1982 | Stenkvist et al. | |
| 4,468,782 A | 8/1984 | Stenkvist | |
| 4,541,099 A | 9/1985 | Rappinger et al. | |
| 4,618,963 A | 10/1986 | Rappinger et al. | |
| 4,640,447 A | 2/1987 | Geller et al. | |
| 4,694,464 A | 9/1987 | Camacho | |

(List continued on next page.)

FOREIGN PATENT DOCUMENTS

| | | |
|---|---|---|
| DE | 3501401 A1 | 1/1985 |
| EP | 0 645 584 A1 | 3/1994 |
| WO | WO 94/04631 | 3/1994 |
| WO | WP 95/17981 | 7/1995 |

Primary Examiner—Mark H. Paschall
(74) Attorney, Agent, or Firm—Pretty, Schroeder & Poplawski, P.C.

(57) ABSTRACT

A waste treatment system is provided, including a waste melter system and an air pollution control system. Hazardous and/or radioactive waste in drums is conducted through a waste feed system into a plasma chamber where the waste is exposed to heat from a plasma torch. A part of the waste volatilizes and leaves the plasma chamber for a secondary reaction chamber, in which the waste is combusted to form a waste gas stream. The air pollution control system treats the waste gas stream through quenching, filtering and scrubbing, to produce a clean gas stream suitable for release to the atmosphere. Offgas may be recirculated through the waste treatment system as desired. The waste remaining inside the plasma chamber melts and drops onto sloped processing surfaces inside a hearth located below the plasma torch. The hearth includes ground electrodes configured for electrical contact with waste held in the hearth so that the melted waste in the hearth may be further heated by the plasma torch. As the melted waste is heated inside the hearth, the hearth is static, enabling the melted waste to separate into a first metal fraction having a high specific gravity and a second slag fraction having a relatively lower specific gravity. When the melted waste is processed sufficiently, the hearth is first lowered from the plasma chamber and then tilted in a first direction to pour the slag fraction and then tilted in another to pour the metal fraction from under an underflow weir configured in the hearth. The hearth includes a second ground electrode strategically situated near the underflow weir to ensure that the waste remains melted as it flows through a flow path under the underflow weir.

53 Claims, 10 Drawing Sheets

U.S. PATENT DOCUMENTS

| | | | |
|---|---|---|---|
| 4,710,607 A | * 12/1987 | Wilhelmi et al. | 219/121.52 |
| 4,770,109 A | 9/1988 | Schlienger | |
| 4,831,944 A | 5/1989 | Durand et al. | |
| 4,969,940 A | 11/1990 | Schwarb et al. | |
| 4,989,522 A | 2/1991 | Cline et al. | |
| 4,998,486 A | 3/1991 | Dighe et al. | |
| 5,005,494 A | 4/1991 | Schlienger | |
| 5,017,754 A | * 5/1991 | Drouet et al. | 219/121.36 |
| 5,028,248 A | 7/1991 | Wiliams et al. | |
| 5,060,913 A | * 10/1991 | Reid | 266/162 |
| 5,066,325 A | * 11/1991 | Lehto | 75/499 |
| 5,136,137 A | 8/1992 | Schlienger | |
| 5,153,896 A | 10/1992 | Hamy et al. | |
| 5,166,950 A | 11/1992 | Jouvaud et al. | |
| 5,173,920 A | 12/1992 | Bochsler et al. | |
| 5,174,811 A | 12/1992 | Schmidt et al. | |
| 5,199,363 A | 4/1993 | Cheetham | |
| 5,222,448 A | 6/1993 | Morgenthaler et al. | |
| 5,230,292 A | 7/1993 | Workman et al. | |
| 5,281,790 A | 1/1994 | Handfield et al. | |
| 5,286,430 A | 2/1994 | Downs et al. | |
| 5,319,176 A | 6/1994 | Alvi et al. | |
| 5,370,066 A | 12/1994 | Workman et al. | |
| 5,374,403 A | 12/1994 | Chang | |
| 5,399,833 A | 3/1995 | Camacho | |
| 5,408,494 A | 4/1995 | Schlienger | |
| 5,451,738 A | 9/1995 | Alvi et al. | |
| 5,493,578 A | 2/1996 | Fukusaki et al. | |

\* cited by examiner

METHOD AND SYSTEM FOR HIGH-TEMPERATURE WASTE TREATMENT

BACKGROUND OF THE INVENTION

The invention relates generally to a method and system for treating waste materials, and in particular, to a method and system for applying very high temperatures to destroy and treat radioactive waste and other hazardous materials.

Hazardous waste disposal is a continuing problem in the United States and elsewhere. In the past, hazardous waste was most often simply buried and left in underground landfills. There was always a danger, however, that the buried waste would escape from the landfill to the environment, e.g., by leaching into ground water.

Efforts have been made to guard against environmental contamination by encapsulating solid waste inside highly durable materials. For example, solid waste has been enclosed in drums, set in concrete, and encapsulated inside environmentally stable vitreous materials. These packaging methods are problematic, however. Great care must be taken to ensure that the packaging or containers remain intact to prevent the hazardous materials from being released to the environment. This is especially difficult in the case of radioactive wastes, some of which have very long radioactive half-lives and remain dangerous for many thousands of years. Also, the packaging materials add significantly to the mass and volume of the waste itself so that a great deal of extraneous material must then be transported and buried or stored.

Additionally, previously known methods for packaging hazardous waste have not generally done much to separate the waste according to the particular severity of the hazards presented. For example, radioactive waste from a nuclear power facility might include highly radioactive waste, less radioactive but nevertheless highly contaminated construction materials, and used clothing and protective gear that may be only lightly contaminated. These various materials present different levels of danger, and may require greater or lesser care in their handling and disposal. Moreover, different materials may be amenable to treatment according to different methods. Nevertheless, these different materials are not usually separated before disposal. As a result, more waste may be disposed of and more expense incurred than would otherwise be desirable. Sorting and separating the waste, though, are difficult and potentially dangerous procedures that may subject the disposal workers to a significant exposure danger. This too adds to the cost and difficulty involved in safely and permanently storing hazardous waste.

More recently, systems and methods have been devised for destroying and treating hazardous waste with very high temperatures. For example, it has been suggested that hazardous waste be destroyed using a plasma torch, a device capable of generating temperatures on the order of ten thousand degrees centigrade.

Such very high temperature methods are capable of destroying and rendering harmless some important and highly problematic categories of dangerous waste. For example, toxic polychlorinated biphenyls (PCBs) are decomposed and rendered harmless at sufficiently high temperatures. Moreover, extremely hazardous medical waste such as "sharps" and other dangerous medical materials are sterilized by even relatively moderate heat.

High-temperature waste disposal methods are further advantageous in that they include an inherent separation and sorting of the waste material. At the very high temperatures used in these methods much of the waste oxidizes, pyrolyzes, and volatilizes into a hot gaseous effluent stream. The gaseous effluent stream is then treatable with conventional air pollution control apparatus. After treatment, the resulting clean gas stream can then be released to the atmosphere.

As much of the waste volatilizes away, the denser parts of the waste, consisting mainly of metals and inorganic compounds, melt to form a molten liquid melt material. This melt material may further separate into two fractions, a first fraction consisting substantially of the relatively dense molten metals, and a second "slag" fraction, which tends to separate and float on top of the metal fraction. If desired, the slag fraction can then be separated from the metal fraction by a variety of means and methods for further treatment and storage.

Although various methods and systems have been proposed and tried for treating hazardous waste at very high temperatures, the technology is still relatively undeveloped and much room remains for improved methods and systems. A definite need exists, therefore, for an improved method and system for treating hazardous wastes by the application of a very high temperature heat source.

It is desirable that such improved method and system provide for the controlled and continuous processing of waste so that the waste enters a high-temperature region at a steady and controllable rate. It is also desirable that the new method and system allow for whole drums or other waste containers to be processed without any substantial pre-sorting or shredding and allow for the treatment of intact drums of 115 liter, 210 liter or larger, containing a variety of wastes and varying compositions. It is desirable that the system be simple, robust, and reliable, and require relatively little maintenance and that any maintenance by simplied by modular design of system components.

It is further desired that the improved method and system facilitate convenient separation of the processed waste into its constituent parts and be operable to volatilize a large fraction of the waste to produce a gaseous effluent stream wherein the gaseous effluent stream is treatable for eventual safe release into the atmosphere. It is yet further desired that the remaining waste be separated into at least two fractions; a relatively dense molten metal fraction having a high specific gravity, and a relatively less dense "slag" fraction having a specific gravity substantially less than that of the metal fraction, wherein the two fractions are divisible using simple, reliable, highly controllable means into separate portions for long-term storage or disposal. These and other advantages are provided by the present invention, which is described in more detail below.

SUMMARY OF THE INVENTION

The present invention, which addresses the above need and provides the foregoing advantages, resides in a method and system for treating various types of wastes. The system includes as its primary components, a melter system and an air pollution control system. The melter system includes a number of elements and subsystems—a waste feed system, a waste treatment chamber in the form of a plasma chamber, a plasma torch mounted on a plasma torch mounting assembly, a hearth, a hearth spool section, a melt collection chamber, and a secondary chamber. The air pollution control system includes an evaporative cooler, one or more pulsed-jet fabric filter baghouses, one or more high efficiency particulate air (HEPA) filter banks, a wet packed bed with full quench scrubber, a reheater, an induced draft (ID) fan, offgas recirculation systems and a stack. A reactant air supply system may also be included to assist reactions in the plasma chamber and the secondary chamber.

The system is equipped to treat whole, unopened drums of waste materials, requiring little or no pretreatment of the drums. The waste drums are loaded into a feed chamber and then fed in a slow, controlled manner by the waste feed system into the plasma chamber, where the primary processing of the entire drum and its contents occurs. Within the plasma chamber, the organic constituents of the waste are volatilized, pyrolized and/or partially combusted while the metals and other inorganic materials are incorporated into a molten pool in the hearth. The molten pool consists of both metallic and vitreous phases which are removed separately in a distinct manner. The offgas from the plasma chamber is ducted to the secondary reaction chamber where it is contacted with excess air. A natural gas burner is used to preheat the secondary chamber and provide supplemental heat and a continuous source of ignition during operation. While in the secondary chamber, the offgas is reacted with excess oxygen to further ensure destruction of substantially all remaining organic material.

After exiting the secondary chamber, the offgas is drawn from through the remainder of the system by the induced fan. The offgas is initially partially quenched in an evaporative cooler and then introduced into the baghouse for removal of the larger particulate, followed by treatment by the HEPA filter banks for removal of finer particulate. After exiting the HEPA filter banks, the offgas is substantially saturated in a water quench and passed through a packed bed scrubber for removal of the acid gases. The clean saturated offgas is then demisted and reheated above its saturation temperature prior to passing through the induced draft fan. After the induced draft fan, portions of the offgas is recirculated back the feeder chamber, the plasma chamber, and/or the scrubber, while the remaining portion is exhausted into the atmosphere through the stack.

The plasma chamber of the melter system, when operating continuously or in batches, allows for a melting (processing) mode and a collection (pouring) mode. Advantageously, the hearth is maintained static or stationary during the melting mode, so as to be devoid of substantially all motion relative to any lateral, vertical or rotational axis or plane during the melting mode. As such, disturbance within the molten bath is substantially minimized to allow the separation of the slag phase from the metal phase.

To facilitate the separation and retention of the phases, the hearth is provided with an underflow weir effectively creating a main compartment having one depth and a side compartment separated by the underflow weir at a greater depth. With separate pour spouts for the compartments, the "lighter" slag phase and the "heavier" metal phase may be independently poured from the hearth with minimal cross contamination.

A tilt mechanism is provided to enable the hearth to be poured during the collection mode. With a control mechanism enabling operator-initiated and operator-controlled pouring, the tilt mechanism enables the hearth to be moved in a distinct manner combining a pivotal and translational motion which minimizes stress to the plasma chamber and disturbance to the molten bath. In one embodiment, an arrangement of pivotal links and sliding blocks enables the hearth to be substantially translated vertically, tilted in one direction, and then tilted in an opposing direction.

The hearth is configured also to provide sloped processing areas that are positioned below the feed regions where the waste materials are introduced into the plasma chamber. The sloped areas enable the waste materials to be introduced gradually into the molten pool contained within the hearth, minimizing any splashing which tends to increase the stress on the plasma chamber and its refractory lining. Whereas the hearth of the present system is stationary during the melting mode, the plasma torch is rendered mobile relative to three normal axis to ensure that the molten bath within the hearth is thoroughly treated. Multiple ground electrodes are strategically placed within the hearth such that the resulting arc may be predominantly or selectively transferred to different sites in the hearth. As such, thorough treatment of the molten bath is achieved and the pouring and collection process is facilitated. In one embodiment, a central ground and a peripheral ground are provided, the central ground being positioned somewhat in the center of the main compartment of the hearth and the peripheral ground being positioned adjacent the underflow weir. To help guide molten lead from the central ground and toward the underflow weir, a raised region circumscribing the central ground is provided in the hearth.

The melter system of the present system employs a modular design enabling the plasma chamber, the hearth and the melt collection system to be readily joined for operation of the system or separated for maintenance and the like. Overall, the system utilizes minimal movement during processing, reducing equipment failure and increasing reliability of the process.

Recognizing the aggressive nature of the treatment process, a reactant air supply system may be provided to enable flexibility and control over the atmosphere within the various chambers as appropriate for different waste materials. For example, operator-controlled air splitting between the upper and lower levels within the plasma chamber enables operating conditions (i.e. reaction stoichiometry) to be modified and varied as appropriate.

Other features and advantages of the present invention will become apparent from the following detailed description of the preferred embodiment, taken in conjunction with the accompanying drawings, which illustrate by way of example the principles of the invention.

BRIEF DESCRIPTION OF THE DRAWINGS

The invention is explained in more detail below with reference to the accompanying drawings in which.

DESCRIPTION OF THE PREFERRED EMBODIMENTS

Figure 1:
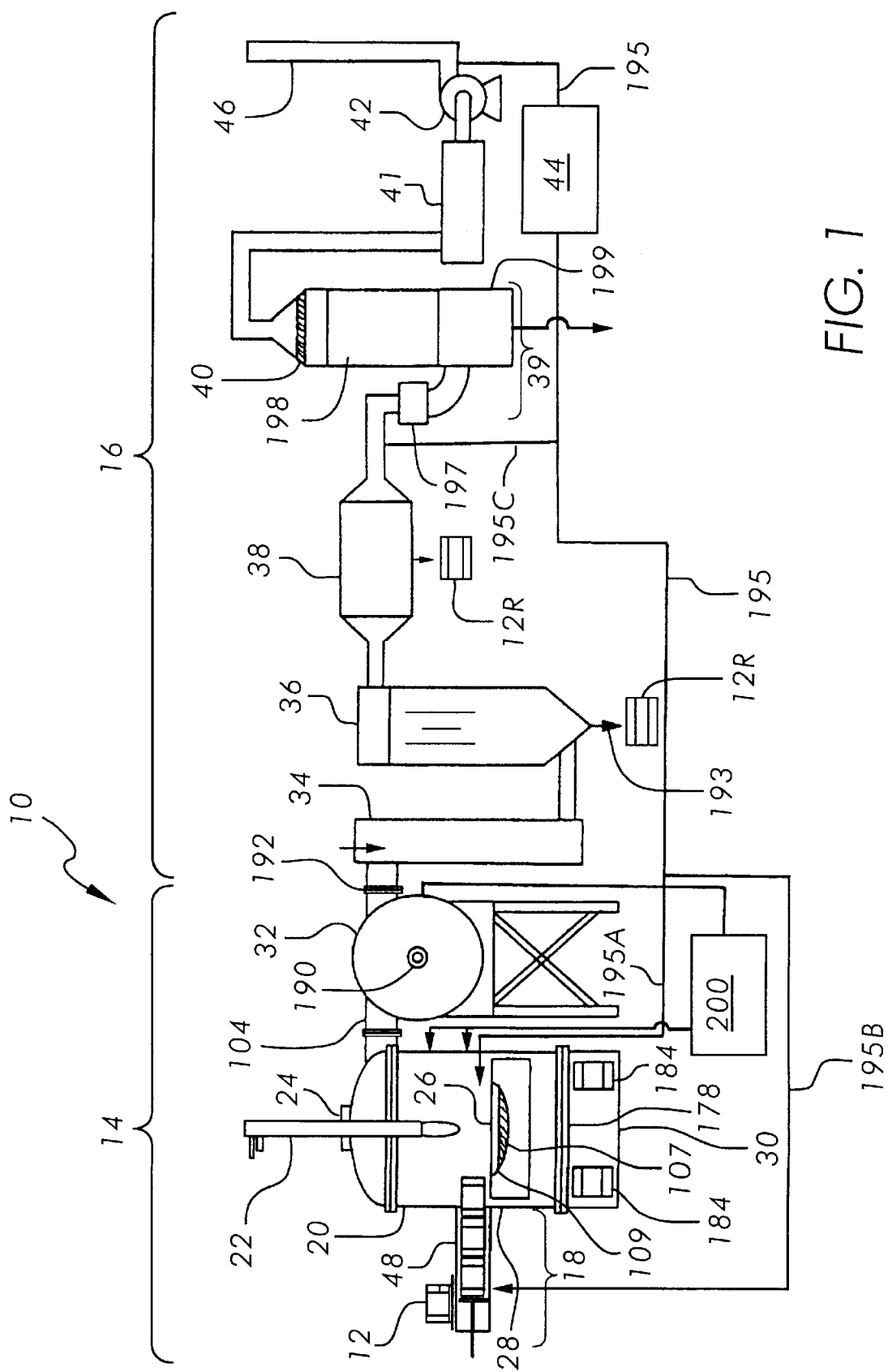
FIG. 1 is a schematic view of a system for use in the invention.

A system 10 for high-temperature waste treatment is shown in FIG. 1, utilizing a plasma hearth process (PHP) which may treat hazardous, radioactive, and mixed (i.e. both hazardous and radioactive) wastes in solid and/or liquid form. The system 10 may treat wastes having low heating value, high metallics and glasses, or high water content organic and inorganic sludges, wherein organic sludges have been known to produce an extremely aggressive environment. The system 10 may also treat wastes of high heating value such as polyethylene and polypropylene or high chloride wastes such as carbon tetrachloride, polyvinylchloride (PVC) and trichloroethane. The system 10 may also treat heterogeneous mixtures of wastes such as metal, glass, wood, paper, plastic, and other debris materials, and even secondary process wastes such as baghouse filter bags, flyash collected in baghouses, spent HEPA filters, and other process wastes.

The wastes for treatment by the system 10 may be contained in whole, unopened drums 12 of varying size, e.g., ranging between one liter to 350 liters, but typically being approximately 210 liters. The drums 12 may be constructed of a variety of materials, such as metal, metal alloy, plastic or fiberboard.

The system 10 includes as its primary components, a melter system 14 and an air pollution control system (APCS) 16. Also referring to FIGS. 2 and 3, the melter system 14 includes a number of elements and subsystems: a waste feed system 18, a waste treatment chamber in the form of a plasma chamber 20, a plasma torch 22 mounted on a plasma torch mounting assembly 24, a hearth 26, a hearth spool section 28 housing a hearth tilt mechanism 29, a melt collection chamber 30, and a cyclonic secondary chamber 32.

The air pollution control system 16 includes an evaporative cooler 34, one or more pulse-jet baghouse filters 36 operated in parallel, one or more high efficiency particulate air (HEPA) filter banks 38, a wet packed bed scrubber 39 with full quench, a demister 40, a reheater 41, an induced draft (ID) fan 42, offgas recirculation systems 44 and a stack 46.

Figure 4:
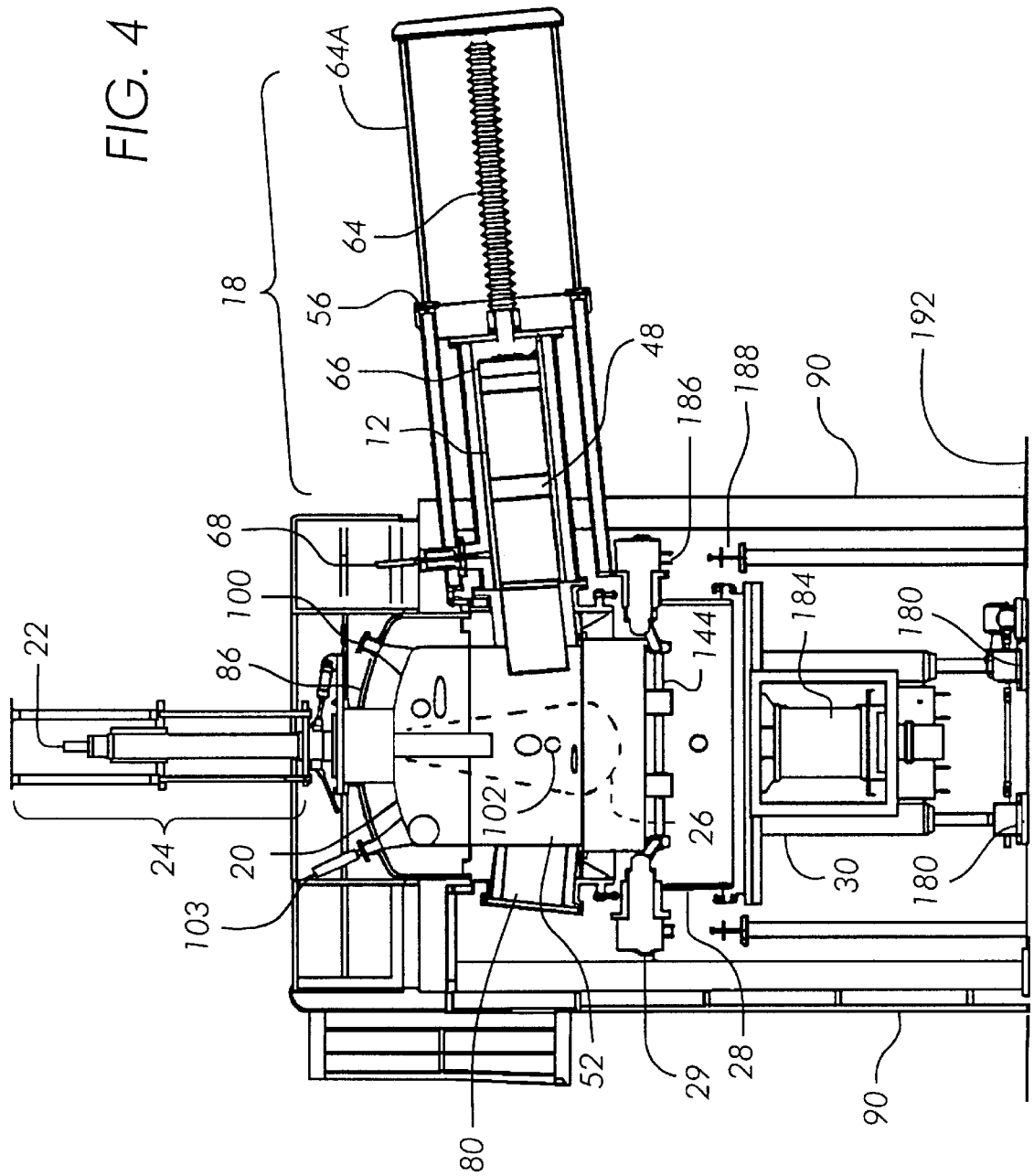
FIG. 4 is an elevation view showing a plasma chamber for use with the invention.

Referring also to FIG. 4, the waste feed system 18 enables controlled processing by providing slow and controlled feeding of the drums 12 into the plasma chamber 20 which substantially eliminates process upsets that may result from large amounts of materials being fed into the plasma chamber 20 instantaneously. Slow, controlled feeding also ensures that the waste or feed materials are drip-melted into the hearth 26 so that the feed materials are substantially processed before entering the molten pool in the hearth 26. Rapid volatilization is thus controlled whereas waste destruction efficiency and melt pool homogeneity are enhanced.

Figure 3:
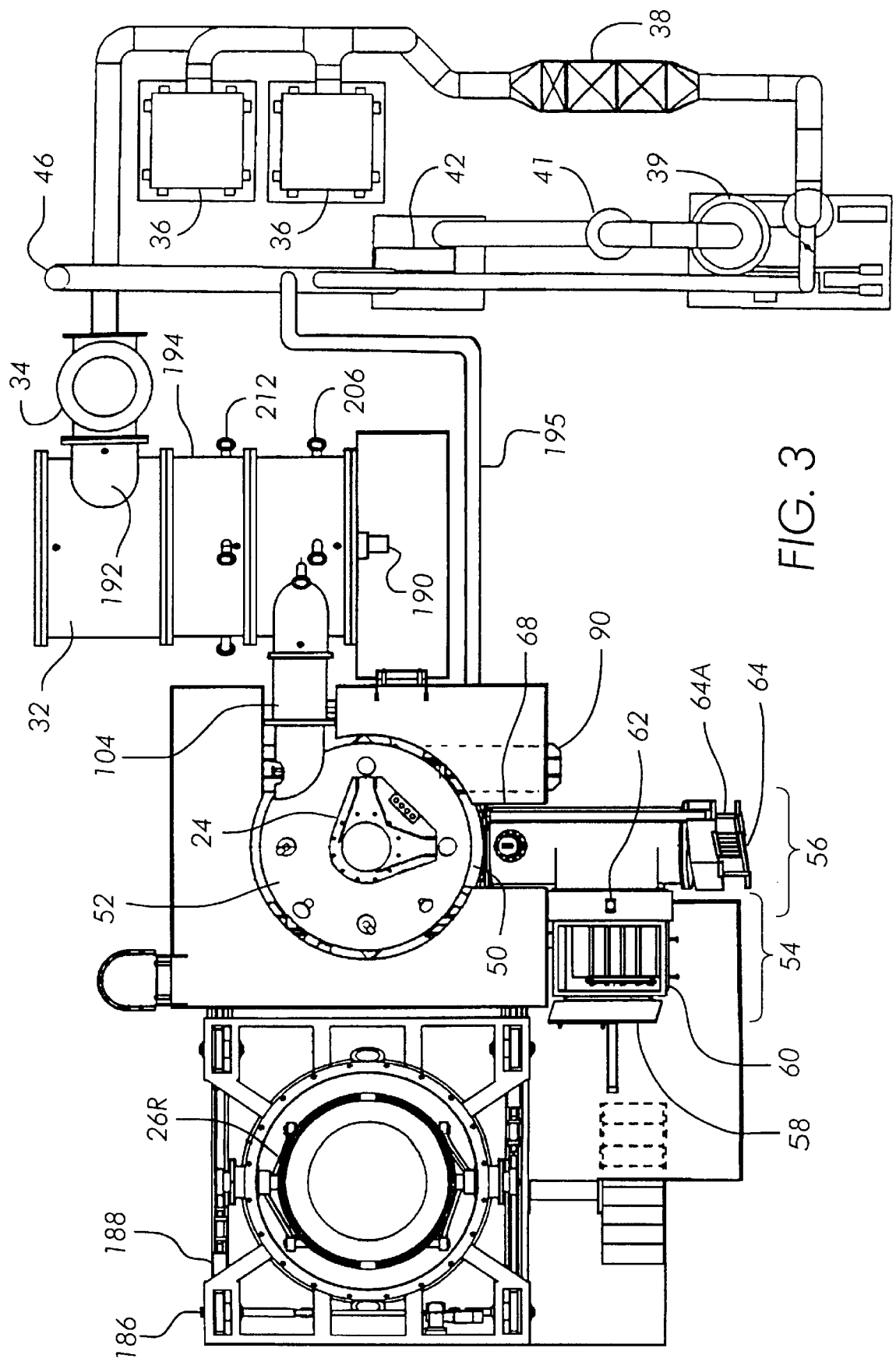
FIG. 3 is a plan view of the system depicted in FIG. 2.

As best shown in FIGS. 3 and 4, the waste feed system 18 may include a substantially horizontal, water-cooled cylindrical feeder chamber 48 defining an entry passage 50 feeding into an interior cavity 52 of the plasma chamber 20. The feeder chamber 48 may be equipped with an air-lock system 54 (FIG. 3) for drum loading and a system of variable speed hydraulics 56 for feeding the waste drums into the plasma chamber 20. As the waste drums 12 are exposed to very high temperatures inside the plasma chamber 20, a section of the feeder chamber 48 adjacent the plasma chamber may be refractory lined, with the remaining portions of the feed chamber 48 incorporating a cold-wall design. The hot and cold refractory may be similar to those used with the plasma chamber 20, as described in detail further below.

The air-lock system 54 (FIG. 3) consists of an outer door 58, an air-lock chamber 60, a hydraulically actuated inner door 62, and a hydraulically operated transfer mechanism for moving the drums 12 from the air-lock chamber 60 to the feed chamber 48. The air-lock chamber 60 maintains stable conditions with respect to pressures, temperatures, and off-gas flowrates in the system 10 during drum loading. If the air-lock system 54 is not provided, a large surge of air would enter the plasma chamber 20 when the feeder chamber 48 is accessed, due to the subatmospheric pressure maintained within the system 10, creating process control difficulties. In addition, the air-lock system 54 enables the system 10 to control contamination when treating radioactive wastes.

The feed chamber 48 may hold multiple drums 12 and feed them sequentially. Accordingly, the drums 12 are loaded horizontally into the air-lock chamber 60, transferred into the feeder chamber 48, and moved axially towards the plasma chamber 20 where they are processed in a slow, controlled manner.

As indicated, the waste feed system 18 includes hydraulics 56. In one embodiment, the waste drums are fed into the plasma chamber 20 by a feed ram 64 that is enclosed in a bellows and driven via a yolk arrangement by two external hydraulic rams 64A, as best shown in FIG. 4. The rams 64A may be enabled to operate continuously, with forward stroke speed of the rams 64A adjustable so that one to three drums are fed into the plasma chamber 20 every hour. However, it is noted that depending on the waste type the feed rate may range between approximately 135 kg/hr for high Btu wastes to 680 kg/hr for low Btu wastes. To minimize the interruption in waste feeding, the ram 64A retraction speed may be enabled to operate relatively fast.

The feed ram 64 is equipped with a plunger head 66 which contacts the drums 12. The position of the feed ram 64 may be indicated on a process control panel to allow operational control. Incidentally, it will be observed that the bellows and yolk arrangement are provided as an additional measure against radioactive contamination.

The drums 12 may have vents and HEPA cartridges installed in their bungs. To vent the drums 12, drum lids may be punctured prior to loading into the feed chamber 48, or prior to entering the plasma chamber 20 by a drum puncher 68. Venting the drums 12 serves to reduce any potential for pressurization of the drum due to volatilization of the waste materials as it enters the high temperature region of the plasma chamber 20. If the drums 12 are not punctured, they may pressurize with flammable or explosive gases prior to being breached. By puncturing the drums 12 and passing a continuous purge stream of recycled flue gas or nitrogen gas through the feed chamber 48, the potential for explosive gas buildup in either the feeder chamber 48 or the drum 12 is significantly reduced.

In one embodiment of the system 10, the drums 12 may enter the plasma chamber 20 simultaneously from different directions. Because energy from the plasma arc radiates radially, feeding from multiple directions facilitates efficient consumption of the plasma arc energy, increasing the throughput of the system 10. To that end, the melter system 14 includes an additional waste feeder system 80 (FIG. 4) defining a second entry passage 82, for dual feeding. The additional system 80 is equipped with its respective chamber, air lock and hydraulic systems operating in a manner similar to that of the feeder system 18. For all multiple feeding systems, at least one full drum is between one of the feeder rams 64 and the plasma chamber 20 at most times. Any one of the multiple feeder entry passages may be sealed when the respective waste feed system is not in use.

Figure 2:
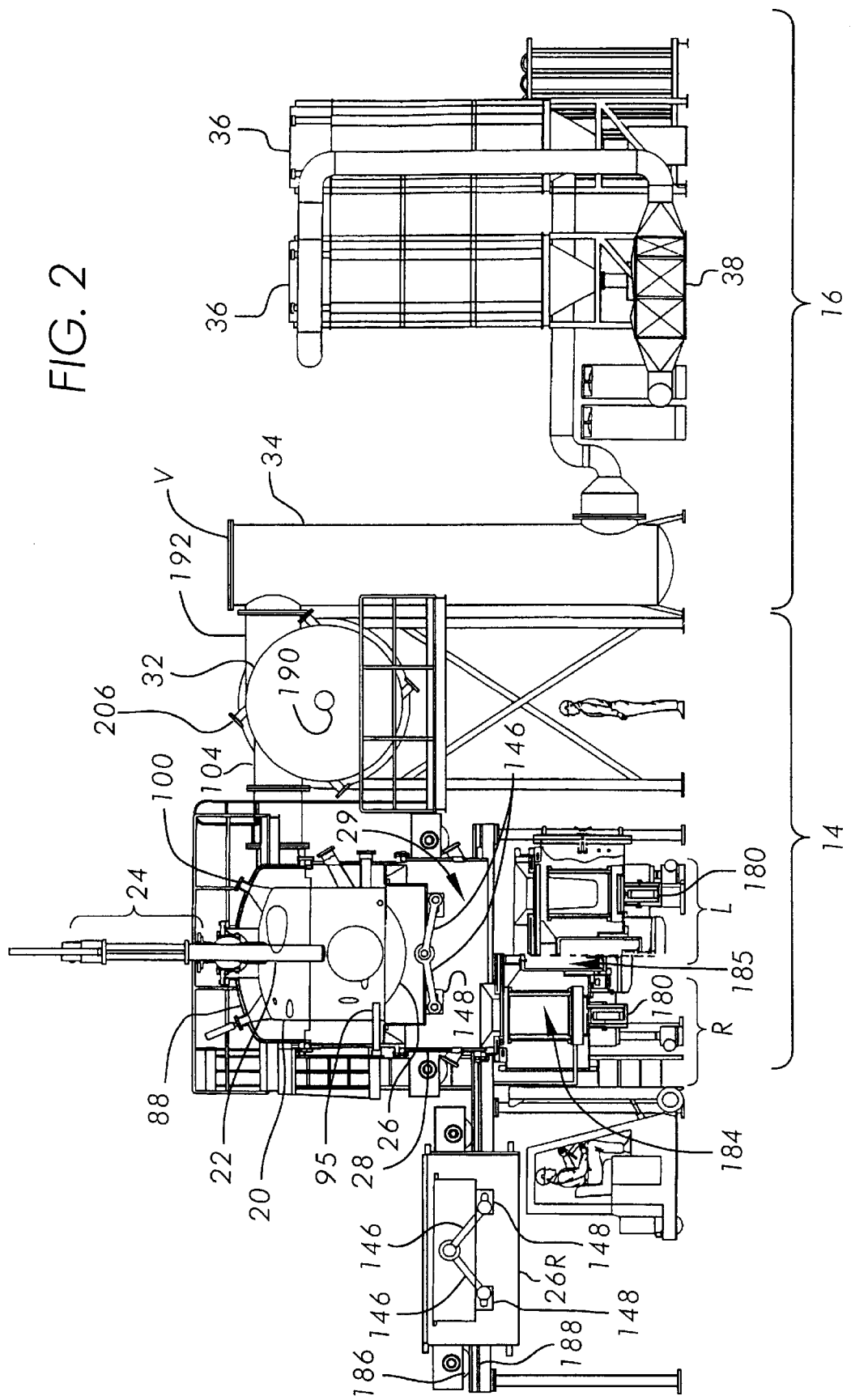
FIG. 2 is a first elevation view of a system embodying the invention.

Referring to FIGS. 2 and 4, the plasma chamber 20 defines an area of convergence between the feed system 18, the torch 22, and the hearth 26. The plasma chamber 20 during operation is effectively integrated with the hearth 26 such that the hearth 26 acts as a bottom to the plasma chamber 20. The plasma chamber 20 may be variously configured to provide the interior cavity 52 where the waste treatment process begins. In one embodiment, the plasma chamber 20 is of a double-wall, vertically oriented cylindrical design with a domed top portion 86. The chamber 20 may have an exterior diameter of approximately 2.75 meters and a height dimension of approximately 2.5 meters. It can be seen that the plasma chamber 20 may be readily modified to provide interior cavities of different shapes and volumes.

The top portion 86 of plasma chamber 20 is equipped with a flanged opening 88 configured to provide an opening through which the plasma torch 22 is inserted and oriented downward toward the hearth 26 to sit within the interior cavity 52 of the plasma chamber 20. Although the opening 88 is present, access by the operator or personnel into the plasma chamber 20 is achieved substantially through lowering of the hearth 26 as explained below in further detail.

As temperatures in the interior cavity 52 of the plasma chamber 20 may reach several thousand degrees Centigrade (but are typically between approximately 1,200 to 1,370 degrees Centigrade), the plasma chamber 20 is lined with refractories and the double-wall design of the chamber 20 shell may include an interstitial cooling fluid system 98. To that end, the chamber 20 may be sized for a thermal density of 336 kW/m$^3$ or even higher at maximum heat loading conditions.

Figure 4A:
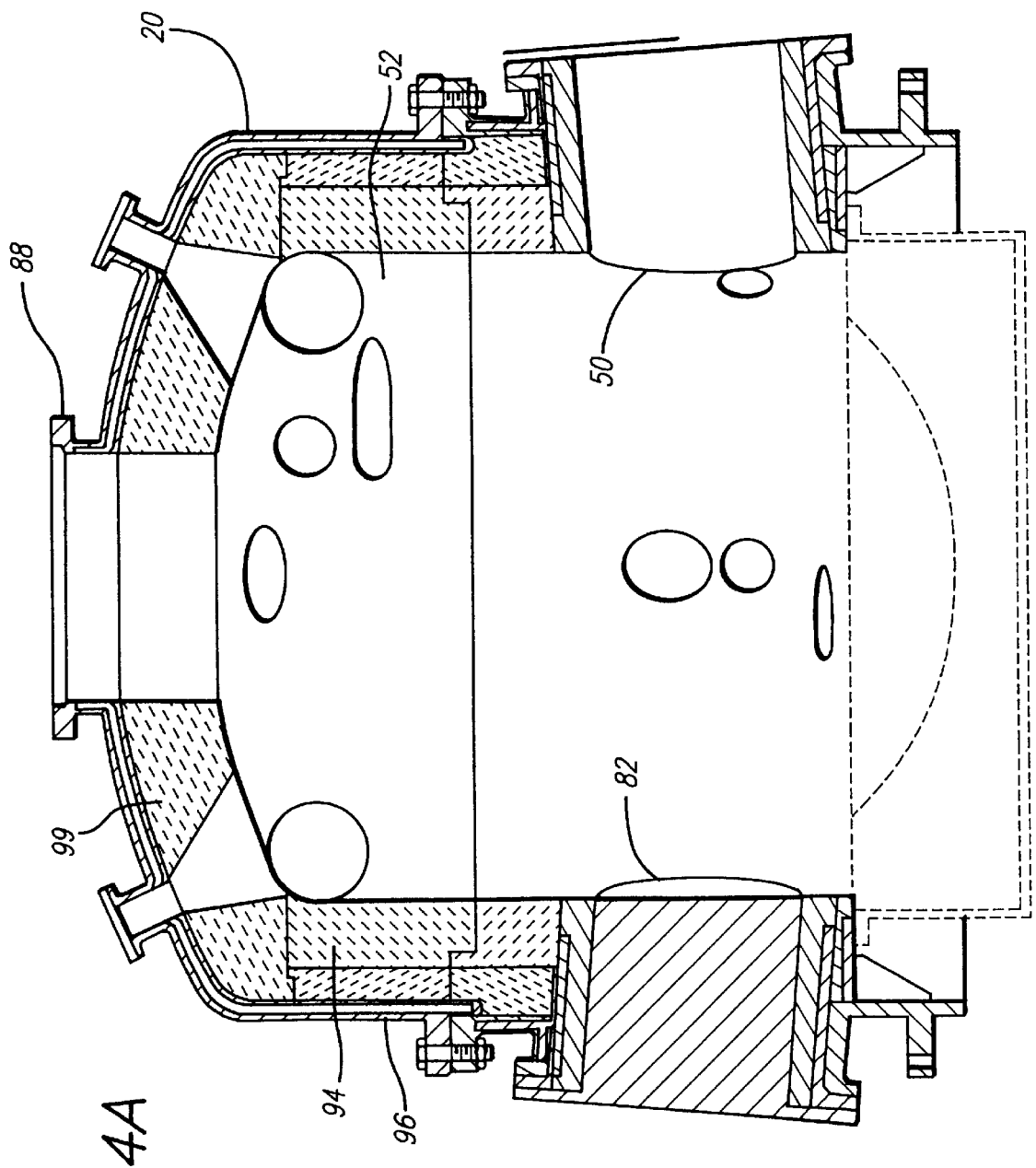
FIG. 4A is partial cross-sectional view of the plasma chamber shown in FIG. 4.

As shown in FIG. 4A, the refractories of the plasma chamber 20 are arranged in a layered configuration, including a hot surface refractory 94 and a cold surface refractory 96. The hot surface refractory 94 is selected based upon the ability to resist the extremely high temperatures in the plasma chamber 20 and the aggressive chemical attack from the process gases that are encountered during normal operation of the system 10. The cold surface refractory 96 is selected based upon its compatibility with the hot surface refractory and upon minimizing heat loss to the cooling fluid system 98, e.g., a water jacket.

In one embodiment of the plasma chamber 20, the hot face refractory 74 includes a layer of, e.g., approximately 23.0 cm thick 70% alumina brick and the cold surface (insulating) refractory includes a layer of, e.g., approximately 11.4 cm thick, 1650 degrees C., insulating firebrick. Moreover, the domed top portion 86 of the plasma chamber 20 may be lined with a hot face refractory 99 including a layer of, e.g., approximately 30.0 cm thick layer of approximately 70% alumina ramable plastic refractory supported by ceramic anchors. Additionally, the water jacket of the cooling system 98 may utilize forced convection through the double-wall shell of the plasma chamber 20. Generally, the fluid cooling system provides safe external surface temperatures and limits the temperatures and thermal expansion of the shell of the chamber 20 such that positive seals and subatmospheric pressures can be maintained within the plasma chamber 20.

A coating designed to further minimize heat loss and provide a corrosion barrier for protection from acid gas condensate, such as Pacmastic 325™, may be placed between the cold surface refractory 96 and the water jacket 98.

With substantially all of the components of the melter system 14 mating with the plasma chamber 20, the 10 plasma chamber 20 is typically considered the primary structural component of the melter system 14. Accordingly, the plasma chamber 20 is rigidly supported by, e.g., legs 90 affixed to a support surface or ground 92.

The plasma chamber 20 may provide openings or is ports 100 in the cylindrical walls 84, for a variety of purposes, e.g., for accommodating a natural gas fired burner 102 used for controlled heat-up and cool-down of the chamber 20, for enabling the introduction of reactant air into the interior cavity 52, for housing image-capturing devices, such as video cameras 103, various temperature, pressure measuring devices, and the like.

As mentioned above, the plasma chamber 20 is configured to receive waste drums 12 from the waste feed system 18. The drums 12 are exposed to very high temperatures sufficient to melt, react and/or vaporize the waste contained inside, as well as the drums 12 themselves, as the drums 12 enter the plasma chamber 20. To that end, the plasma torch 22 provides the heat to melt, react and vaporize both the drums 12 and the waste into offgas and a molten bath or pool.

Referring to FIG. 4, the plasma torch 22 is situated to extend through the flanged opening 88 into the plasma chamber 20 to accomplish heating of the plasma chamber 20. In particular, the plasma torch 22 penetrates the plasma chamber 20 at an angle normal to the domed top portion 86.

The plasma torch 22 is of the transferred type and may be a Retech™ model RP-600T transferred arc torch, having a nominal power output rating of 1.2 MW, but adjustable down to approximately 600 kW. The torch 22 is available through Retech, a Division of M4 Environmental Technologies Inc., Ukiah Calif. The plasma torch 22 may be water-cooled and equipped with a high-temperature refractory material that provides an insulating shroud to minimize heat loss to a torch cooling system 106. In one embodiment, the insulating shroud is constructed of high temperature alumina refractory such as Harbison Walker Novacon 65®.

Distinctly, the torch 22 is mobile in three directions of movement as enabled by a servomechanical positioning system that is part of the torch mount assembly 24. While the hearth 26 remains static during the melting mode, the torch 22 may be moved in a pattern selected by the operator to facilitate effective treatment of the waste materials. To that end, the torch 22 can be extended into or withdrawn from the chamber 20 along a first axis of motion. The torch 22 can also be tilted at an angle away from the vertical orientation as shown. The torch 22 tilts in two separate and perpendicularly-oriented directions. Thus, the torch 22 can be moved by controlling movement in both directions to move the electrode end in an arcuate pattern inside the chamber 20. Through automatic control with a manual override, the torch 22 is manipulated about these three degrees of freedom to move the electrode end through a swept volume that defines a partial cone inside the plasma chamber 20, as shown by broken lines. In typical operation of the system 10, the arc from the torch 22 is transferred to the molten bath contained within the hearth 26, where the current travels through the molten bath to one or more ground potential terminations integrated into the hearth 26 described in detail further below.

By taking advantage of both the plasma energy and the joule heating within the melt pool, the system 10 generates high molten product temperatures in the plasma chamber 20. These higher temperatures allow greater processing flexibility and control, as well as the production of a much higher-stability, vitreous material. At the higher temperatures, much higher glass forming compound percentages can be used while still maintaining a molten product sufficiently nonviscous that it can be readily poured from the hearth 26. Moreover, torch motion combined with the joule heating increases mixing and reactions within the melt pool, further improving the waste destruction efficiency and the homogeneity and quality of the final vitreous product. Distinctly, the ground electrodes enable joule heating to be applied to the materials in the hearth 26 which assists in processing the waste materials and also helps to maintain a fully molten metal phase.

The torch 22 may use nitrogen as its primary plasma gas; however, helium, argon, air, or other gases may also be used in combination with nitrogen as appropriate for startup and torch optimization. And, within the plasma chamber 20, an alternate starting/grounding path 95 for the plasma torch 22 may be provided, so that the arc can be initiated during startup and re-established if the torch 22 goes out. The starting mechanism 95 facilitates the establishment of an arc in the event that the torch 22 has been shut-down and the molten bath has solidified.

The starting mechanism 95 may consist of a rod 95A, e.g., a solid steel rod, a sold carbon rod, or a water-cooled copper rod. The rod 95A is inserted into the plasma chamber 20 at an elevation just above the hearth 26 and can be moved automatically and then manually by the operator. The rod 95A provides the ground path until the material in the hearth 26 is heated to the point where it becomes electrically conductive. At this time the starting rod 95A may be moved automatically or manually Referring still to FIG. 4, as the leading drum 12 is pushed into the plasma chamber 20 by the other drums 12 and the plunger head 66, the leading drum 12 enters an extremely high temperature region inside the plasma chamber 20. As the drum 12 enters the plasma chamber 20, the leading end of the drum 12 melts away, exposing the waste itself to the high temperatures inside the chamber 20. As the drum 12 and its contents continue into the chamber 20, the more volatile, mainly organic compounds volatilize and react inside the plasma chamber 20. At the same time, the metals and inorganic compounds melt and drip downward into the hearth 26 which is positioned to act as the bottom of the plasma chamber 20 while the system 10 is in operation.

The melted material is thus contained within the hearth 26 where it separates again into two distinct fractions or phases—a first fraction 107 (FIG. 1) consisting mainly of molten metals and metal alloys, and a second "slag" fraction 109 (FIG. 1) consisting mainly of inorganic compounds. The slag 109, substantially less dense than the molten metal, separates from and floats on top of the metal 107. Although the slag 109 may include materials having very high melting points, the extreme conditions in the hearth 26 ensure that the slag 109 remains liquid, semi-liquid, or at least sufficiently pourable.

It is noted that various criteria are considered for efficient and effective operation of the plasma chamber 20. Factors affecting the torch size include waste composition (i.e., heat content of the waste), required plasma arc standoff length which is typically dictated by the size of the waste containers, and the desired waste processing rate for the system. A summary of various materials and energy balance design values are shown Table I below:

TABLE I

| Waste Type | Waste Energy Content (kJ/kg) | Waste Feed Rate (kg/h) | Process Air Required (std m³/min) | SC Offgas Volume (act. m³/min) at 8% $O_2$ and 982 C |
|---|---|---|---|---|
| Low Btu | 2.3 | 680 | 0.14 | 13 |
| Inorganic Sludge | 1,200 | 680 | 3.2 | 60 |
| Nominal Waste | 9,300 | 430 | 17.0 | 198 |
| Organic Sludge | 19,900 | 205 | 20.0 | 181 |
| High Cl Content | 13,700 | 280 | 16.0 | 147 |
| High Btu | 27,400 | 135 | 16.0 | 142 |

Net Torch Energy=720 kW
Plasma Chamber Volume=193 ft³
Secondary Chamber Volume=225 ft³

Once the power requirements for the plasma torch 22 have been defined, the plasma chamber size can be determined. To that end, it has been observed that excessively high energy densities in the plasma chamber 20 reduces the lifetime of refractory materials installed in the chamber and renders the temperature control in the downstream process equipment difficult. Optimum energy density for the system may be substantially in the range of 310–360 kW/m³.

Figure 5:
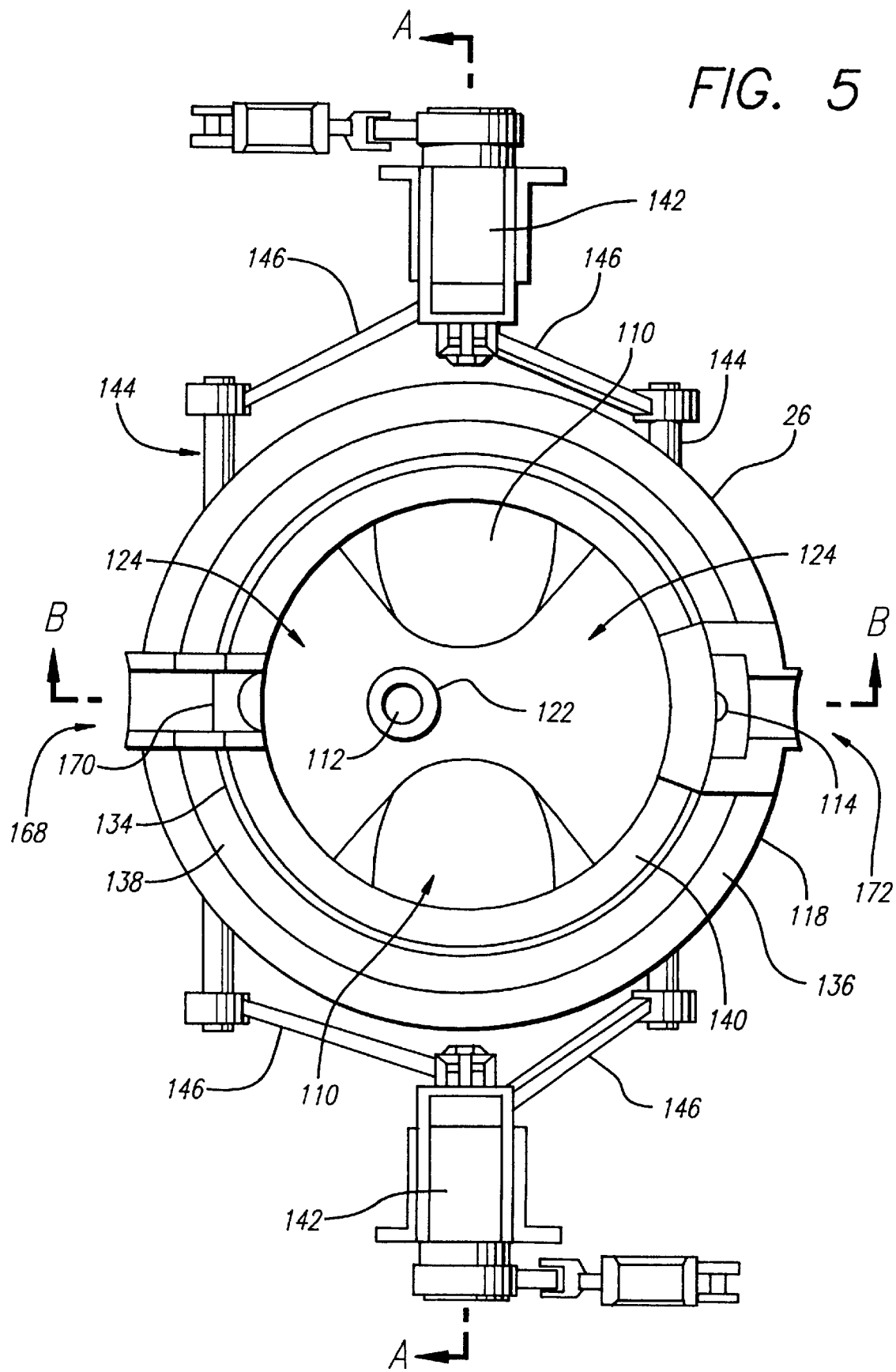
FIG. 5 is a plan view of a hearth for use in the system shown in FIGS. 2–4.
Figure 6:
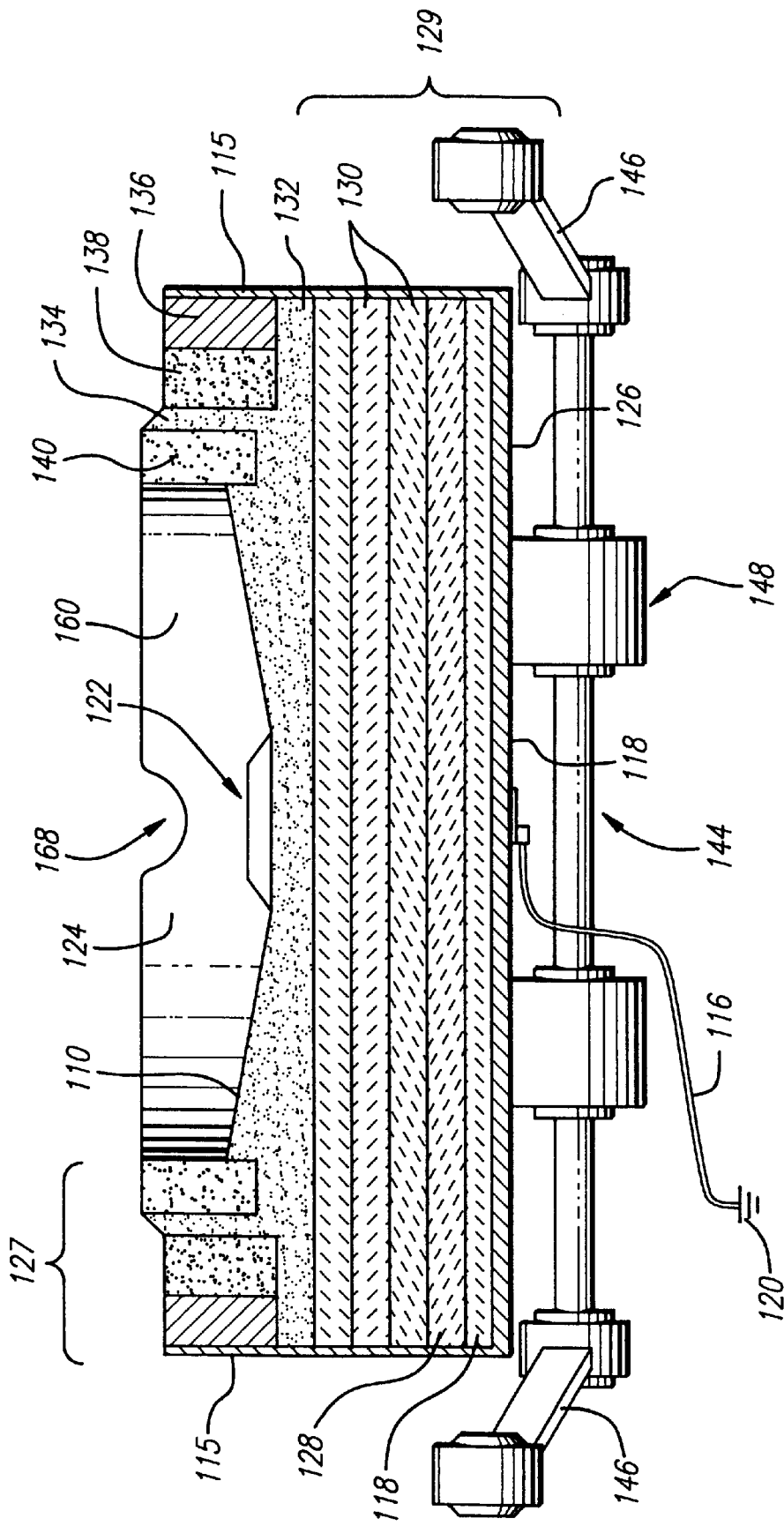
FIG. 6 is a cross-sectional view of a hearth depicted in FIG. 5, taken along lines A—A.
Figure 7:
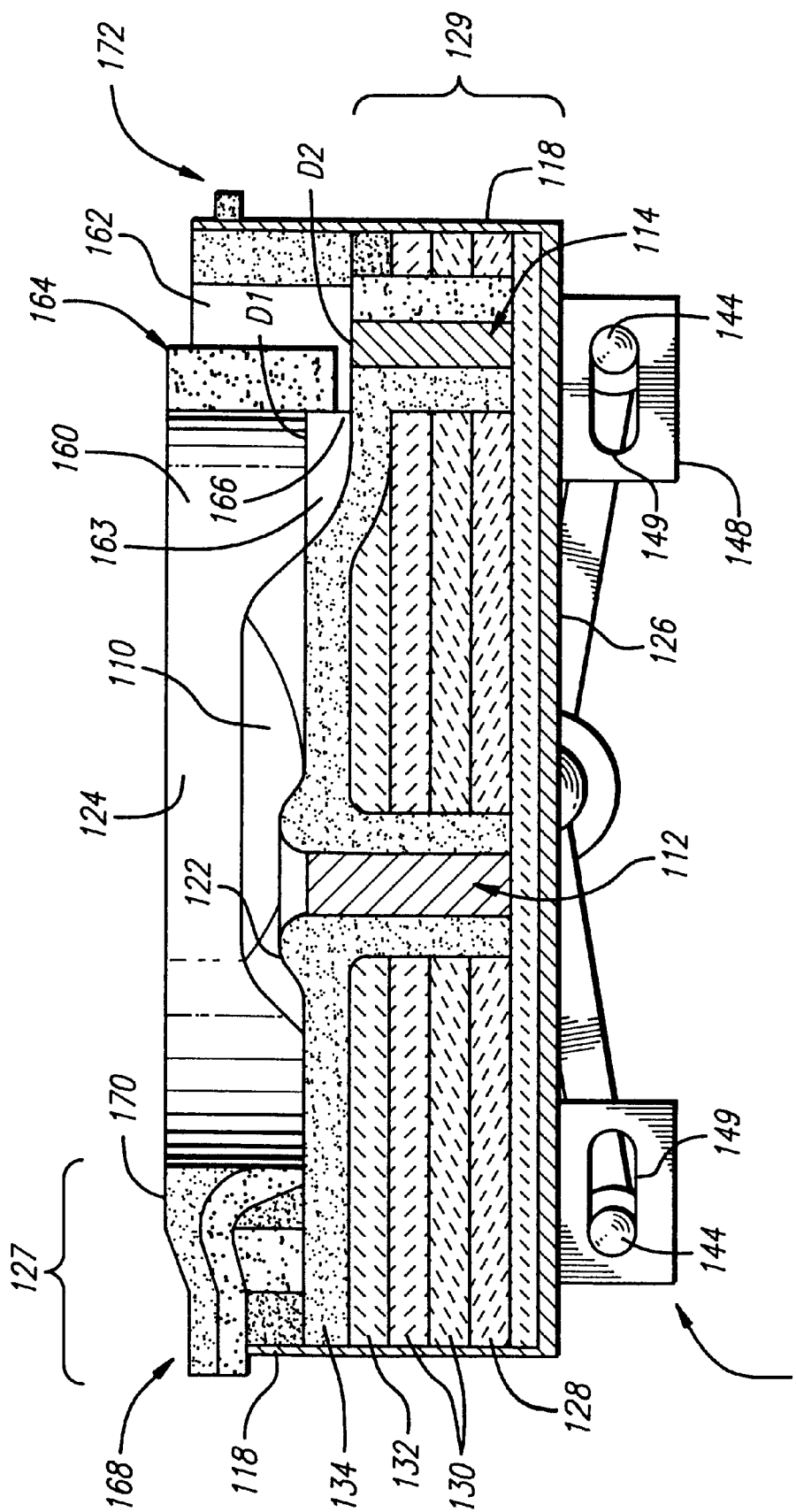
FIG. 7 is a cross-sectional view of the hearth depicted in FIG. 5, taken along lines B—B.

Referring primarily to FIG. 5 but also to FIGS. 6 and 7, the hearth 26 includes a pair of sloped processing surfaces 110 sloping downward toward the center of the hearth. One of these processing surfaces 110 is positioned directly under each of the waste feed systems (FIGS. 2 and 4) when the hearth 26 is in place against the bottom of the plasma chamber 20. Where the second waste feed system 80 is provided, the other processing surface 110 is aligned therewith. As the plasma torch 22 heats and melts waste materials entering the plasma chamber 20, those materials fall a relatively short distance to the sloped processing surface 110. The materials then melt and slide or run down the sloped processing surfaces 110 to the center of the hearth 26.

This sloped configuration provides for steady, controllable waste processing. The short drop of approximately a few centimeters from the feed system 18 to the hearth 26, and the steady and gradual melting of the leading edge of the drum 12 entering the plasma chamber 20 minimizes impact stresses from waste falling into the hearth 26. The sloped processing surfaces 110 allow the gradual introduction of waste materials into the molten pool at the bottom of the hearth 26 and thereby reduce or eliminate splashing, which could damage the plasma chamber refractory by creating localized hot spots on its inner surface. The sloped feed surfaces 110 also speed processing by preventing the waste from sinking into the molten bath, which otherwise would have caused the formation of a "skull," i.e., previously molten material that freezes around the colder feed material, typically requiring remelting prior to melting of the feed. Feed materials exposed directly to the hot plasma gases tend to melt faster on the sloped feed areas 110.

Gradual and controlled entry of waste materials into the plasma chamber 20 and the hearth 26 also helps to minimize mechanical, thermal, and chemical fluctuations in the system, and allows for more controllable and more efficient waste treatment.

In accordance with a feature of the present invention, the hearth 26 remains static as the waste materials are drip-melted to form the molten bath in the hearth 26. That is, substantially no lateral, rotational or other translational impetus is imparted to the hearth 26 during the melting mode of operation. The static hearth 26 serves to retain the molten residuals which provide a chemically aggressive thermal mass that facilitates processing any waste materials introduced into the molten bath.

However, to achieve thorough treatment of the melt, the hearth 26 may provide a plurality of ground electrodes with which the torch 22 may selectively conduct. In one embodiment as illustrated in FIGS. 5 and 7, the hearth 26 includes a first, main ground electrode 112 and a second, peripheral or outer ground electrode 114, the significance of which is explained further below. The first and second electrodes 112 and 114 are strategically situated at different locations in the hearth 26. A ground cable 116 (FIG. 6) connects the ground electrodes 112 and 114 through a steel plate 118 at the bottom of the hearth 26 and a water-cooled support plate 126 to an electrical ground 120.

Referring to FIGS. 5, 6 and 7, the hearth 26 may be configured to provide a raised ring 122 surrounding the first electrode 112 to guide molten lead away from the first electrode. The hearth 26 is also distinctly configured to provide a relatively larger exposing surface to depth ratio, enhancing the mass transfer between the slag and gas phases. This configuration also enhances mixing within the molten bath due to both thermal gradients and torch agitation.

With FIGS. 5, 6 and 7 showing details of one embodiment of the hearth (or crucible) 26, it can be seen that the hearth 26 may be constructed from a single steel shell 115 being rolled or otherwise formed into the desired circular or elliptical shape which is then welded to the solid steel bottom plate 118. The side shell 115 may be cooled via convective heat transfer to the plasma chamber purge air and via radiative heat transfer to the external wall of the hearth spool section 28. The bottom plate 118 may be mounted directly to the liquid cooled (e.g., water-jacketed) support plate 126 which provides the physical support, ground and monitoring system attachments, and the means for attaching the hearth tilt mechanism 29 to the hearth 26. Any or all of the hearth 26 may be liquid cooled and/or bolted together. As such, the utility attachments, support system, and the tilt mechanism 29 may be attached to side sections 127 of the hearth 26 rather than the liquid-cooled support plate 126.

The liquid-cooled support plate 126 also maintains acceptable operating temperatures in the regions below the hearth 26 and protects the components of the hearth tilt mechanism 29. The water cooled walls of the hearth spool section 28 maintains acceptable operating temperatures in the region surrounding the hearth 26 and further protects the components of the hearth tilt mechanism 29.

The side shell 115 and the bottom plate 118 of the hearth 26 are refractory lined. The inner layers or the hot surface refractory materials of the hearth 26 are selected especially for resistance to heat and corrosion from the molten bath and the outer layers, or the cold surface refractory materials, are selected to minimize heat transfer and for compatibility with the inner layers.

In one embodiment, a bottom section 129 of the hearth 26 formed with the plate 118 includes one layer of highly insulating brick 128 (e.g., K26-LI), two layers of a moderately insulating, higher temperature brick 130 (e.g., K33-LI), one layer of a high temperature, high density brick 132 (e.g., Ruby SR); and one layer of ramming mix 134 (e.g., Ruby Ram and/or chrome castable) forming the hot face refractory in contact with the bottom portion of the melt. The ramming mix 134 also encases the ground electrodes 112 and 114 down to their termination at the plate 118 in the bottom section 129 of the hearth 26. The ramming mix 134 continues as a contiguous, intermediate layer up through side sections 127 to the top of the hearth 26.

As for one embodiment of the side sections 127 shown in FIG. 6, it includes one layer of highly insulating brick 136 (e.g., K26-LI) next to the steel shell 118, one layer of a high temperature, high density brick 138 (e.g., Aladin 80); the layer of ramming mix 134 forming a contiguous layer throughout the bottom and side sections 129 and 127 of the hearth 26; and one layer of a high temperature, high density brick 140 (e.g., Ruby SR) forming the melt line hot face or slag/gas interface. As for the external surfaces of the side sections 127, they may be air cooled and designed to maintain a surface temperature of approximately 230 degrees Centigrade.

In general, the brick refractories provide better performance and longer useful lives in this type of environment and thus they are situated to interface with the melt. However, because the brick refractories may allow molten materials to pass through interstitial spaces between the bricks, a contiguous layer of rammed refractory makes up the hot face material on the hearth bottom 129 and extend up through the side sections 127, providing a seal against molten metal. For structural stability, the brick refractories of the bottom section 129 may be either keyed circle bricks or straight bricks cut to shape. But, for the brick refractories of the side section 127, circle or arch bricks may be provided at the slag/gas or melt line interface to ensure dimensional stability. In accordance with a feature of the present invention, the hearth 26 is static during the melting mode. However, the hearth may be mobilized for pouring, but normally only when a sufficient quantity of waste has been processed and melted into the hearth 26 and the operator is satisfied with the treatment of the molten bath. Accordingly, the operator initiates the collection mode by initiating and controlling the tilt mechanism 29 for moving the hearth 26.

Referring specifically to FIG. 4, the tilt mechanism 29 is housed in the hearth spool section 28 which is typically positioned below the plasma chamber 20 but above the melt collection chamber 30 while the melter system 14 in use. As such, hydraulic actuators and major assemblies of the tilt mechanism 29 are located outside the plasma chamber 20 in order to facilitate equipment maintenance, increase operational safety, and to minimize the potential for contamination of the equipment when treating radioactive wastes. While the tilt mechanism 29 mobilizes the hearth 26 during the pouring mode, it also provides general support to the hearth.

As shown in FIG. 2 and in further detail in FIGS. 5, 6 and 7, one embodiment of the tilt mechanism 29 includes a pair of rotatable actuators 142, a pair of hearth tilt shafts 144, a pair of pivotable links 146 and a pair of sliding blocks 148. In particular, the shafts 144 are driven by the actuators 142 via the pivotable links 146 and the hearth 26 is coupled to the shafts 144 through the sliding blocks 148. As the actuators 142 rotate under the control of the operator, opposing links 146 within each diverging pair are effectively "extended" and "retracted" to move the shafts 144 situated within the sliding blocks 148, which in turn move the hearth 26.

Figure 5A:
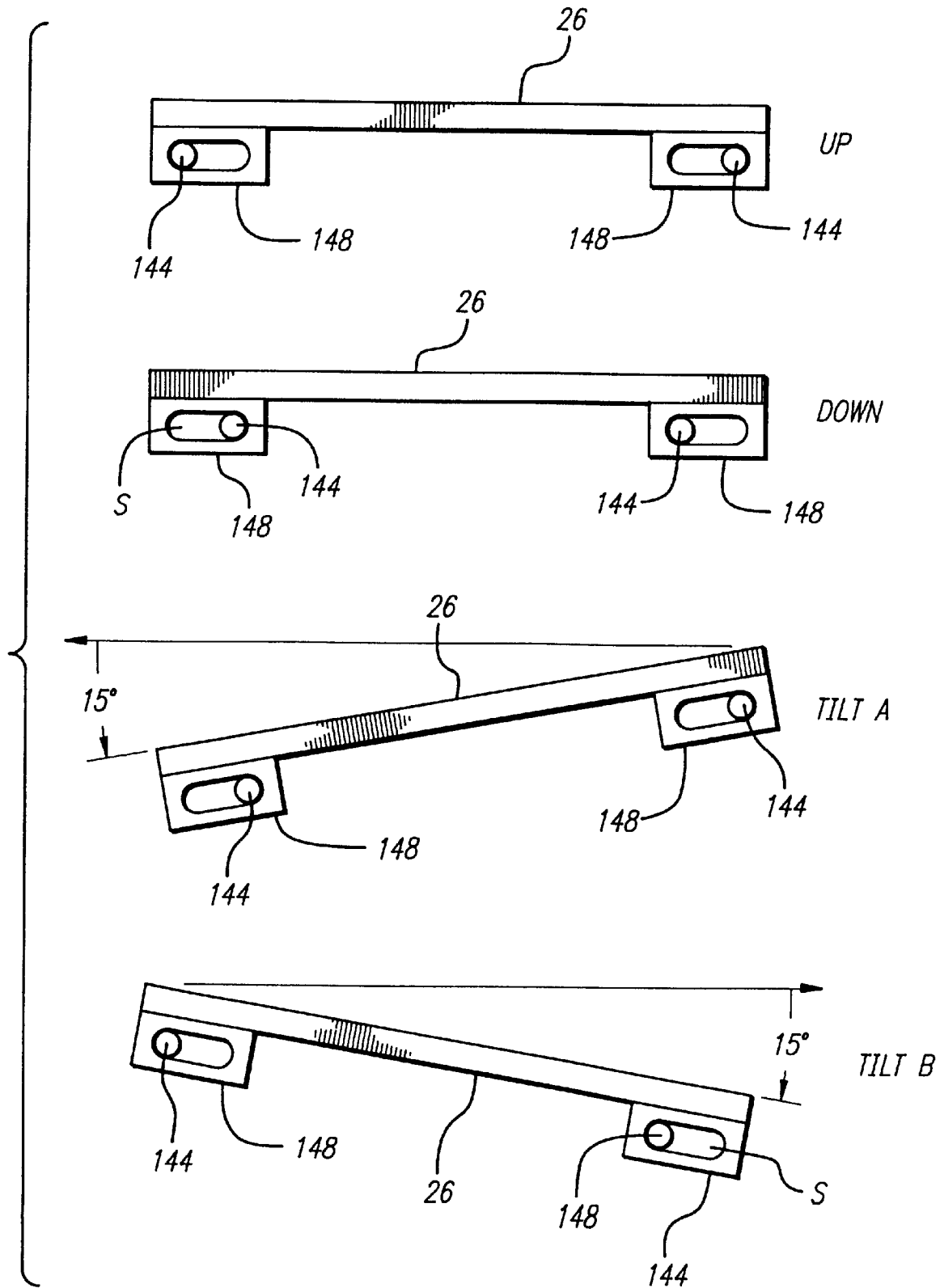
FIG. 5A is a partial elevation view showing a distinct motion pattern of a hearth used in the invention.

Referring specifically to FIG. 5A, the hearth 26 may be enabled by the tilt mechanism 29 to attain various positions, e.g., a raised position, a lowered position, a first tilting position and a second tilting position wherein the first and second tilting positions are substantially diametrically opposed to each other. It can be seen that while the hearth 26 is in the raised position, the pair of shafts 144 have been moved by the actuators 142 via the pivotal links 146 into a relationship of greatest separation as limited by slots S configured in the sliding blocks 144. Moreover, while the hearth 26 is in the lowered position, the pair of shafts 144 have been moved into a relationship of least separation. Furthermore, while the hearth 26 is in one of the tilted positions, the pair of shafts 144 have been moved into a relationship of intermediate separation, that is, both shafts 144 are either to their extreme "right" or to their extreme "left," as shown in FIG. 5A. In accordance with a feature of the present invention, the hearth 26 is tilted approximately 15.0 degrees when pouring is accomplished for both the metal phase 107 and the slag phase 109. As such, minimal movement is imparted to the hearth 26 during the collection mode for reducing stress, mishaps, or accidents which may otherwise occur with greater movement or mobility.

Overall, it can be seen that the tilt mechanism 29 imparts a translational (vertical) movement and a rotational (pivoting or tilting) movement in the hearth 26. In one embodiment, the hearth 26 may be raised into position with the plasma chamber 20 so as to form a sealed bottom portion of the plasma chamber 20 for operation in the melting mode, and subsequently lowered to initiate pouring of the hearth 26 during the collection mode. Once lowered, the hearth 26 may be tilted in the two diametrically opposing directions for collecting the slag phase 109 and then the metal phase 107 (FIG. 1). The hearth 26 while being tilted in the two opposing directions may experience a slight lateral translation, which magnitude may be increased or decreased, as appropriate, with adjustments in the configuration of the various components of the tilt mechanism 29.

After the phases 109 and 107 have been collected, the hearth 26 may be again raised to form the sealed bottom portion of the plasma chamber 20 for another melting mode. As discussed below in further detail, the tilting of the hearth 26 in the two opposing directions together with the distinct weir configuration of the hearth 26 allows the slag phase 109 and the metal phase 107 of the molten bath to be collected substantially separately and independently.

Distinctly, the tilt mechanism 29 serves a variety of functions, including, e.g., providing a higher degree of control of slag and metal removal/collection, minimizing the physical interaction of the plasma chamber 20, waste feed systems 18 and the hearth 26 and/or reducing turbulence within the molten bath that may disturb the separated phases. Moreover, because the actuators 142 for the tilt mechanism 29 are located exterior to the spool section 28, maintenance thereof may be readily performed, with reduced chances of personnel contamination from radioactive materials within the plasma chamber 20. Referring particularly to FIG. 7, the interior volume of the hearth 26 may be approximately 0.67 m$^3$. However, to facilitate separate collection of the slag phase 109 and the metal phase 107 (FIG. 1) when the hearth 26 is substantially level, the hearth is configured to provide a main compartment or containment area 160 having primarily one depth D1 and a side compartment 162 having a greater depth D2 which extends somewhat into the first compartment 160 to form a pocket 163. Distinctly, the compartments 160 and 162 are separated by an underflow weir 164 configured to provide a passage 166 at the depth D2.

Referring also to FIGS. 5 and 6 with 7, the hearth 26 is further configured to provide a first outlet in the form of a first spout 168 formed by an overflow weir 170 enabling the molten matter contained in the main compartment 160 to be poured therefrom. Molten matter contained in the main compartment 160 and the pocket 163 may also be poured from the hearth 26 through a second outlet in the form of a second spout 172, via the underflow weir 164 and the side compartment 162.

As mentioned earlier, the first and second ground electrodes 112 and 114 are strategically situated in the hearth 26 relative to the main compartment 160 and the underflow weir 164. In particular, the first electrode 112 is situated substantially in the center of the main compartment 160 for heating the molten pool contained in the main compartment 160. Such heating ensures that the molten pool sufficiently separates into the phases 107 and 109. It is noted that while the plasma torch 22 with which the first electrode 112 conducts may be moved automatically through a predetermined or preselected pattern, such automatic movement is subject to manual override as desired by the operator for any specialized or localized heat treatment of the molten pool in the hearth 26.

To ensure that the passage 166 remains substantially free-flowing for the metal phase 107 to enter the pocket 164, the second ground electrode 114 is situated proximately beneath the underflow weir 164 to heat any phase present. That is, as the torch 22 is moved (either automatically or manually) in treating the molten pool, the arc when conducted through the second ground electrode 114 effectively melts any phase which may block the passage 166.

In accordance with another feature of the present invention, as the waste materials are drip melted into the hearth 26, the heavier metal phase 101 tends to settle toward the bottom of the molten bath, in particular, the pocket 163, whereas the lighter slag phase 109 tends to float near the surface of the molten bath. Accordingly, when the hearth 26 is tilted toward the side of the first spout 168 (under operator control), the lighter slag phase 109 is poured from the hearth 26 over the overflow weir 170. When the hearth 26 is tilted toward the side of the second spout 172 (also under operator control), the underflow weir 170 allows substantially only the heavier metal phase 107 to pour from the second spout 172.

For separate pouring of the slag phase and the metal phase, the hearth 26 and the tilt mechanism 29 are arranged such that the two diametrically opposing tilt directions coincide and align with the first and second spouts 168 and 172 of the hearth 26. It can thus be seen that the cooperative effects of the dual-spout and underflow weir configuration of the hearth 26 and the motion pattern of the tilt mechanism 29 allow the system to provide separate collection of the slag phase and the metal phase. Moreover, with the operator controlling the tilting or pouring of the hearth 26, cross contamination during collection between phases 107 and 109 is substantially reduced if not eliminated, notwithstanding the ratio of slag to metal phase or the exact position of the slag/metal interface in the hearth 26.

It is observed that the tilting process is performed selectively and sequentially, that is, the hearth 26 is selectively tilted in one direction in a slow and controlled manner, allowing one of the separated phases to be poured from the hearth 26 and then selectively tilted in a substantially opposite direction, allowing the other of the separated phases to be poured from the hearth 26. Since the metal phase 107 contains primarily environmentally-inert, recyclable metals, the system 10 effectively enables the metal to be reclassified as low level waste, if not producing a valuable by-product that otherwise would be substantially useless, worthless and expensive to store. Further, since most radioactive and EPA-rated hazardous constituents within the waste material remain within the slag phase 109, separating the slag phase 109 from the metal phase 107 effectively isolates the more hazardous components of the waste material, reducing the volume and/or amount of waste requiring the utmost safe storage.

The hearth 26 may be sized so that a substantially maximum processing time between pours is approximately two to three hours, although this may vary depending on the nature of the waste. Fairly frequent pouring helps to maintain a pourable slag phase 109, which may become stiff if the slag is kept too long in the hearth 26. This stiffening is thought to occur as materials having low melting points volatilize away from the hearth and leave behind melt materials having higher melting points.

Figure 8:
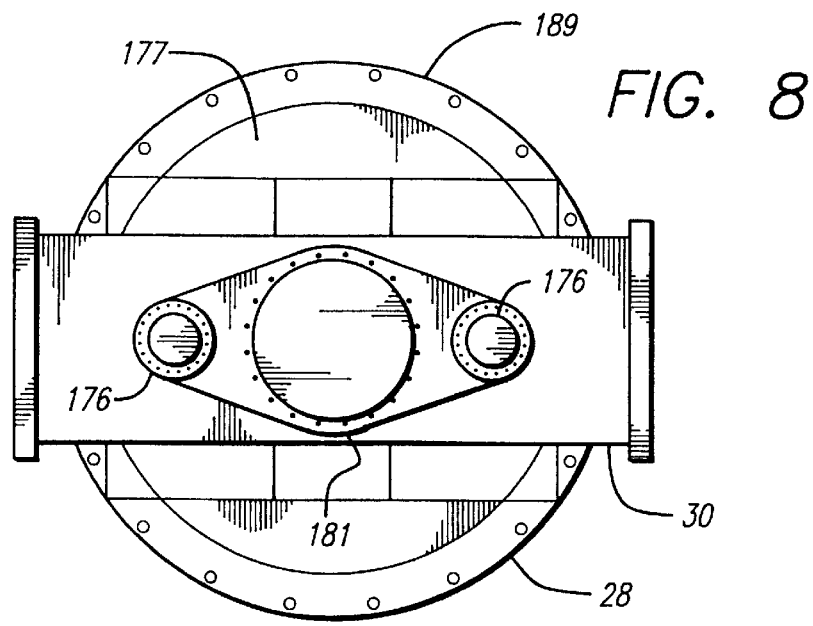
FIG. 8 is a top plan view of a hearth spool section and a melt collection chamber used in the invention.
Figure 9:
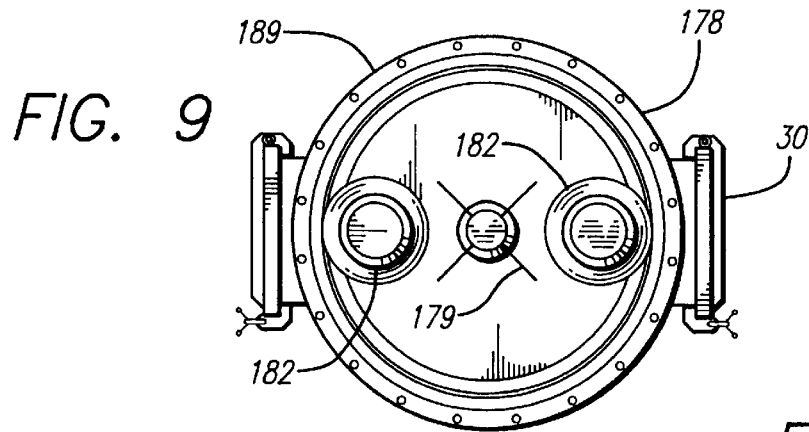
FIG. 9 is a top plan view of a rotary valve and a melt collection chamber used in the invention.

Referring to FIGS. 8 and 9, the hearth spool section 28 is positioned atop the melt collection chamber 30 while the system 10 is in operation. Due to the extremely aggressive nature of the molten materials contained in the hearth 26, the hearth 26 may develop a breach at some point. In order to contain any molten material potentially released from the hearth 26 during a breach, a two part containment system has been incorporated into the system 10. In one embodiment, the first part includes a water-cooled floor 177 provided in the hearth spool section 28, below the hearth 26, that is capable of retaining the molten material. In order to facilitate the pouring and collection of the phases 107 and 109 from the hearth 26, the floor 177 is configured to provide two apertures 176 to align with the spouts 168 and 172 of the hearth 26 supported above (FIG. 5). The apertures 176 are refractory lined passages to facilitate the transfer of molten residuals from the hearth 26 to the melt collection chamber 30 described further below, protecting the components within the hearth spool section 28 from the extreme heat of the melt.

The second part of the containment system may be embodied as a water-cooled, circular steel rotary valve 178 that is positioned between the hearth spool section 28 and the melt collection chamber 30. The valve 178 is rotatably supported on a valving mechanism 179 housed in an opening 181 configured in the floor 177 of the hearth spool section 28, between the apertures 176. The rotary valve 178 also contains two apertures or tap holes 182 which may be aligned with the apertures 176 in the floor 177 (and thus also aligned with the spouts 168 and 172) as appropriate during the collection of the phases 107 and 109. However to contain a breach, the rotary valve 178 is rotatable to close off the apertures 176 of the hearth spool section 28, trapping any containments within the hearth spool section 28.

Accordingly, the rotary valve 178 is maintained open during tapping or collection operations, but is actuated to the closed position during the melting mode and/or when filled vessels 184 are being removed and replaced. In the unlikely event of a hearth breach, the molten material would be retained in the hearth spool section 28 until cooled, at which time the individual sections of the melter system 14 would be separated and the solidified material removed manually.

As shown in FIGS. 2 and 4, the melt collection chamber 30 may be a sealed rectangular chamber of approximately 3.7 meters in length, 1.2 meters in width and 1.5 meters in height and located directly beneath the plasma chamber 20 and hearth spool section 28. Screw jacks 180 at each corner of the melt collection chamber 30, all driven by a single hydraulic motor, may be used to raise the melt collection chamber 30 into place and seal it against the bottom of the hearth spool section 28 (see R—FIG. 2). A water-cooled pylon 185 (shown half raised and half lowered) is oriented vertically through the center of the melt collection chamber 30 and supports the valving mechanism 179 (FIG. 9) for closing the rotary valve 178 for breach control as discussed above. The melt collection chamber 30 has continuous air purge for removal of residual heat from the chamber 30 and to sweep out any process gases that may enter the chamber 30.

When the system 10 is in operation, collection vessels 184, e.g., sacrificial drums for the slag phase 109 and/or reusable or recyclable molds for the metal phase 107, are positioned in the melt collection chamber 30. The collection vessels 184 are encased in removable, water-cooled steel shells that provide a seal against the tap holes 182, remove heat from the molten materials that are poured into the collection vessels 184 from the hearth 26, and/or to contain the melt in the event of a ruptured collection vessel. Doors are provided on either end of the collection chamber 30 to enable the vessels 184 to be loaded and unloaded from the chamber 30, for example, by forklifts.

Best shown in FIG. 2, when a pour is to be made from the hearth 26, the rotary valve 178 between the hearth spool section 28 and the melt chamber 30 is opened and the collection vessels 184 are raised into position beneath the apertures 182, via the hydraulic mechanism. After the pour is completed, the vessels 184 are lowered and the rotary valve 178 is closed.

As mentioned, the plasma chamber 20 operates between a melting mode and a collection mode. In the melting mode, the waste materials are dripped melted into the hearth 26 where the hearth 26 remains static. When capacity has been reached in the hearth 26, the plasma chamber 20 is put on stand-by as the collection process is initiated, commencing with the operator-initiated and operator-controlled tilting of the hearth 26. Thus, if the system 10 is operating continuously, the plasma chamber 20 is simply placed in an idle mode during the collection process. Of course, if the system 10 operates in batches, the system 10 may be shut off and the melt bath allowed to cool. Once cooled, the slag and metal residuals 109 and 107 may be removed as separable solidified phases.

Referring to FIGS. 2, 3 and 4, to facilitate the operation and maintenance of the plasma chamber 20, the hearth 26 and the melt collection chamber 30, the melter system 14 employs a modular design. That is, when the plasma chamber 20 is in operation, these three components are removably joined with each other. In one embodiment, the hearth spool section 28 is positioned below and removably joined with the plasma chamber 20 to serve as the bottom of the plasma chamber 20, and the melt collection chamber 30 is positioned below and removably joined with the hearth spool section 28 to receive the poured phases. Each of these components may be releasably secured to each other by connectors, e.g., in the form of flanges 189 (FIGS. 8 and 9) joined by bolts, or the like.

To separate the hearth spool section 28 and the melt collection chamber 30 from the plasma chamber 20, hydraulically actuated screw jacks may be used to lower the former two components until wheels 186 mounted to the hearth spool section 28 contact roll-out rails 188 designed to support the hearth section 28 a pre-determined distance above the support surface 92. The melt collection system 30 is then separated from the hearth section 28 and further lowered toward the support surface 92, resulting in complete separation of all three components. Best shown in FIGS. 2 and 3, the hearth 26 and the hearth spool section 28 can then be moved to remote locations for maintenance, modification, or replacement while a standby component, e.g., hearth 26R, is raised into position for operation. While the hearth spool section 28 and the melt collection chamber 30 are separated from the plasma chamber 20, the interior cavity 52 of the plasma chamber is accessible for maintenance.

Referring to FIGS. 1, 2 and primarily 3, an embodiment of the secondary chamber 32 is illustrated. The secondary chamber 32 receives volatilized and reacted waste in the form of hot gases (offgas) from the plasma chamber 20 through the inlet duct 104 and completes the conversion of the organic material to carbon dioxide and water vapor.

It is to be noted that while reactions within the plasma chamber 20 effectively vaporize the organic materials into offgas, the plasma chamber 20 typically operates under substoichiometric conditions to facilitate balancing the resultant reaction heat load between the plasma chamber 20 and the secondary chamber 32. Thus, many organics are sent to the second chamber 32 as pyrolysis product. Operation of the plasma chamber 20 at substoichiometric conditions also tends to effectively ensure that any metals present in the waste materials are retained in the reduced metal phase 107 in the hearth 26 rather than being converted into their oxide forms and incorporated into the slag phase 109. Thus, inert and oxidized materials are substantially retained in the hearth 26 as a molten, vitreous slag.

Moreover, it is noted that the chamber 20 operates at subatmospheric pressures, which together with the high integrity sealed design of the vessels 184 and related components, substantially reduces migration of radioactive materials from within the chamber 20 to external building facilities.

Referring to FIGS. 2 and 3, an inlet port or offgas connection 104 is provided to allow passage of the offgas from the plasma chamber 20 to the secondary chamber 32. The inlet port 104 may be refractory lined and/or liquid-cooled in a manner similar to other refractory lined and/or liquid-cooled elements described herein. The cooling liquid system for the inlet port 104 may configured to be operated separately from the cooling liquid system of the plasma chamber 20, to facilitate continued operation of the system 10 in a "hot duct" mode.

In one embodiment, the secondary chamber 32 is a horizontally oriented right circular cylinder 194 substantially sealed with two removably secured ends. The cylinder 194 may be approximately 2.8 meters in outside diameter and 3.7 meters in external length and provide an interior cavity, inside the refractory, of approximately 1.7 meters by 3.1 meters. The internal dimensions are based on an approximately two second residence time of the offgas at the anticipated maximum flow conditions and a length/diameter ratio of approximately 1.82.

The secondary chamber 32 may be both refractory lined and liquid-cooled (e.g. water-cooled). The types of refractory and insulation used in the secondary chamber 32 may be similar to those used in the plasma chamber 20, as discussed above. The hot surface refractory is selected based on its ability to resist the high temperatures in the chamber 32, the primarily oxidizing conditions encountered during normal operation, and the acid gas corrosion potential due to the treatment and destruction of halogenated materials. The cold surface refractory is selected on its compatibility with the hot surface refractory and ability to minimize heat loss to the chamber 32 cooling system. In one embodiment, the hot face refractory may be approximately 11.4 cm thick 70% alumina super duty refractory brick and the cold surface (insulating) refractory is approximately 11.4 cm. thick K-26 (1425 degrees C.), insulating firebrick. The liquid-cooled steel surface, adjacent to the refractory, may be coated with, e.g., Stalastic H. T., to prevent corrosion.

In one embodiment, the secondary chamber 32 is configured with flat ends 196 flanged to the cylindrical body 194. In addition to decreasing construction costs and improving the flow patterns within the chamber 32, this configuration enables various modifications, e.g. increasing the chamber volume, and the like. Access into the chamber interior may be obtained by removing one or both ends of the chamber 32.

The secondary chamber 32 may include a heat source (FIG. 1), e.g., a 1.4 MMBtu/hr natural gas burner 190, near the inlet port 104, to assist reaction of any unreacted materials entering the secondary chamber 32 from the plasma chamber 20, providing an ignition and heat source during operation. Reaction air may also be added to the secondary chamber 32 through one or more tangential ports 206 to better ensure complete reaction of these materials. The reaction air may be added to improve mixing by promoting cyclonic flow of the gases in the secondary chamber 32. Target operating conditions for the offgas exiting the secondary chamber 32 may range between approximately six to ten percent oxygen in the offgas, with offgas residence time in the chamber 32 of approximately two seconds or more, and an exit temperature greater than approximately 980 degrees Centigrade.

If appropriate, ammonia or methane can be injected into the chamber 32 through one or more additional ports 212, downstream of the burner 190 but substantially midway down the chamber 32, to control the formation of $NO_x$ compounds within the chamber 32, as discussed below in further detail. Flow rates and process conditions inside the chamber 32 may be controlled to ensure that the gaseous effluent stream produced inside the chamber 32 is substantially free of unreacted materials. The gaseous effluent stream leaves the chamber 32 through an outlet port 192 at an end of the chamber 32 opposite the inlet port 104, where the gas stream enters the other primary component of the system 10, namely, the air pollution control system 16, described below in further detail.

Summarizing, the waste melter system 14 includes at least one waste feed system 18 for feeding drums 12 containing waste materials into the plasma chamber 20 where the drums 12 are exposed to extreme temperatures created by the plasma torch 22. There the drums 12 and waste materials are steadily drip-melted for containment in the hearth 26 as a molten bath. The molten bath is thoroughly heated and melted as facilitated by the multiple ground electrodes 112 and 114 provided within the hearth 26 with which the movable plasma torch 22 may predominantly or selectively establish the arc.

While the molten bath separates into the "lighter" slag phase 109 and the "heavier" metal phase 107, the hearth 26 is maintained static or stationary, substantially devoid of any rotational or translational motion which may disturb the settling of the metal phase from the slag phase. Thereafter, when the molten bath is ready for collection, the hearth 26 is lowered from the plasma chamber 20 and tilted in one direction and then tilted in an opposing direction by the tilt mechanism 29 housed in the hearth spool section 28. In particular, the hearth 26 is steadily tilted in one direction toward the spout 168 to pour the slag phase 109 and then in a substantially diametrically opposing direction toward the spout 172 to separately pour the metal phase 107. The provision of the underflow weir 164 and the second ground electrode 114 within the hearth 26, and manual control of the tilt mechanism 29 facilitates the pouring process whereby cross contamination between the slag phase 109 and the metal phase 107 is substantially minimized.

To collect the slag phase 109 and the metal phase 107 poured from the hearth 26, the hearth spool section 28 provides apertures 176 which are aligned with tap holes 182 provided in the rotary valve 178 above the melt collection chamber 30. As the slag phase and the metal phase are independently poured from the hearth 26, the phases travel through respectively-aligned apertures 176 and tap holes 182 to fall into separate collection vessels 184 hydraulically raised into position within the melt collection chamber 30.

As mentioned above, the melter system 14 is assembled prior to the system 10 initiating any waste treatment. In particular, the hearth spool section 28 and the melt collection chamber 30 are raised toward the plasma chamber 20 such that the hearth spool section 28 is sealed against the bottom of the plasma chamber 20 and the melt collection chamber 30 is sealed against the hearth spool section 28. For maintenance, the melter system 14 may be disassembled, for example, by lowering the hearth spool section 28 and the melt collection chamber 30 onto the rails 188 where these components are further disassembled from each other. Replacement or standby components may be reassembled with the melter system 14 as appropriate.

While the nonvolatilized waste is drip-melted into the hearth 26, volatilized waste formed in the plasma chamber 20 is received in the secondary chamber 32 in the form of hot gases (offgas). Therein, these hot gases are converted to carbon dioxide and water vapor for further treatment by the other primary component of the system 10, namely, the air pollution control system 16.

Initially, reference is made to Table II below, showing the operating envelope for the air pollution control system 16, based on the information shown in Table I above for the melter system 14.

TABLE II

| Category | APCS Inlet Levels |
| --- | --- |
| Range of Offgas Flowrates | 13 to 198 acfm at 982 C |
| Max. HCL level | 41 kg/h |
| Max. $SO_x$ Level | 0.4 kg/h |
| Toxic Metals (Cd, Hg, Pb, Ag, Cr, Be, As, Tl, Ba, Sb) | The maximum expected concentration of metals in the offgas is not known - thus, conservative design is desirable |
| Max. Particulate Loading | 2% by weight of the waste charge |
| Particulate Size Distribution | 90% less than 10 um (approx.) 50% less than 1 um (approx.) |
| Max. Temperature at the Outlet from the SCC | The max. temperature in the SC outlet should not exceed 1,370 C. The normal SC outlet temperature may range from 982 C to 1,200 C. |

As shown in FIGS. 1, 2 and 3, the offgases from the secondary chamber 32 are drawn into the air pollution control system 16 by the induced fan 42, via the port 192. Once drawn into the system 16, the offgases first encounter the evaporative cooler 34 which cool the offgases. The offgasses are then drawn through one or more baghouses 36 which capture substantially all of the entrained particulate present in the offgasses, and further through the two stage HEPA filter bank 38 including a prefilter and a HEPA filter. Acid gases are removed as the offgases pass through the wet scrubber 39 with full quench. Thereafter, the offgases encounter the demister 40, and then the reheater 41 which raises the temperature of the offgases to well above its dewpoint to eliminate the potential for condensation in the downstream systems. Before the offgases reach the stack 46 for discharge into the environment, portions of the offgases may be tapped by the recirculation systems 44 for purposes described further below.

With respect to the evaporative cooler 34 of the air pollution control system 16, rapidly cooling the offgases from the secondary chamber 32 to approximately 205 degrees Centigrade substantially reduces the formation of dioxins and furans. By minimizing the offgas residence time in the optimum temperature range for dioxin and furans formation, the evaporative cooler 34 is but one of the many means by which the system 16 effectively cleans the offgases. Cooling the offgas also provides an acceptable operating temperature for the baghouses 36.

In one embodiment, the evaporative cooler 34 includes a vertical tower V (FIG. 1) with water spray nozzles located at the top of the tower. The tower V is sized to provide the residence time necessary for complete evaporation of the quench water droplets introduced by the nozzles, thus eliminating any liquid:gas two-phase flow prior to the offgas entering the baghouses 36. The evaporative cooler 34 also functions as a spark arrestor substantially isolating the baghouses 36 from the secondary chamber 32.

Referring primarily to FIG. 1, the evaporative cooler 34 is followed by one or more high temperature fabric-filter pulsed-jet baghouses 36. In one embodiment, two baghouses 36 are utilized to provide the throughput and air-to-cloth ratios for ensuring attainment of a higher level of particulate capture efficiencies. The baghouses 36 remove essentially all particulate substantially greater than approximately 2.0 microns and more than approximately 97% of all particulate larger than approximately 0.5 microns. The baghouses 36 utilize filter bags rated for continuous operation at a temperature of 230° C. and are configured to provide a substantially maximum can velocity (gas velocity within the bag chamber) of approximately 90 meters/min at the substantially maximum offgas flow rates produced during the processing of high organic content feeds. The air-to-cloth ratio ($m^3$/min of gas filtered through a square foot of fabric surface area) are sized at approximately 1.2:1 for the high flow case. Moreover, the baghouses 36 may be enabled to initiate pulsing of the filter bags when the pressure drop across the bags exceeds approximately 12.0 cm of water column. Access ports may be incorporated and situated to facilitate inspection and maintenance of the bags.

Following the baghouses 36 is the two-stage HEPA filter bank 38 including a prefilter and a HEPA filter. Since the temperature of the offgases exiting the baghouses 36 typically exceeds the 120° C. operating limit for standard HEPA filters, the HEPA bank 38 is configured as a high temperature housing utilizing high temperature (260° C.) filter elements.

The first stage of the HEPA filter bank 38 includes an "intermediate" prefilter. This filter is provided to remove the intermediate particulate and protects the high efficiency second stage HEPA filter. The second stage of the HEPA filter bank includes a high temperature HEPA filter. This filter has a rated collection efficiency of approximately 99.97% for particles approximately 0.3 $\mu$m and larger.

In order to protect both the operating personnel and the equipment, the HEPA bank 38 may be a double-skin, insulated, weatherproof shell. The bank 38 may be equipped for monitoring the pressure drop across each stage, and for DOP testing across the entire filter bank.

Following the HEPA filter bank 38 is an integrated wet scrubber 39 including a quencher 197 and a packed-bed scrubber 198, both utilizing a caustic scrub liquor. The quencher 197 is provided to saturate the offgas in preparation for acid gas absorption. In one embodiment, the quencher 197 includes liquor spray nozzles discharging into a vertical chamber connected to the packed-bed scrubber 198 and sharing a common sump 199. The offgas and quencher spray flow concurrently down towards the liquor sump 199 where any excess liquor may be collected and recirculated through the quencher 197. The quencher 197 ensures that the gases reach saturation prior to exiting the quencher 197.

After exiting the quencher 197, the saturated gases enter the packed-bed scrubber 198. Being of the wet type in one embodiment, the scrubber 198 provides random packing internals for enhanced mass transfer during countercurrent flow of the gases and the scrubbing liquor. The liquor may be distributed over the top of the bed 198 using a spray nozzle system, providing a liquid-to-gas ratio of approximately 2.0 to 2.7 $(1/m)/(m^3/min)$. With a pressure drop of approximately 500 to 1250 Pa, the packed-bed scrubber 198 is expected to remove in excess of approximately 99% of the acid from the offgases. Controlled offgas recirculation around the wet scrubber 198, described in detail further below, may be managed by the recycling system 44 to maintain the scrubber 198 within the desired level of liquid:gas ratio operating range.

After acid gases are removed, the system 16 provides the mist eliminator or demister 40 for removing any entrained liquor droplets or mists from the offgas stream.

Prior to reaching the induced draft fan 42, the offgases encounter the reheater 41 which may be electrically operated and may have a double-skin insulated and weatherproof shell. The reheater 41 is sized to raise the saturated offgas temperature by approximately 15–45 degrees Centigrade above its dewpoint for a variety of reasons, including, to ensure that no water droplets enter or form in the induced draft fan 42, to eliminate the corrosion problems associated with condensation in the ducting and stack 46, and/or to ensure that opacity limits are not be exceeded at the stack 46.

The induced draft (ID) fan 42 may be a final component upstream of the stack 46. Drawing the offgases through the system 16, the ID fan 42 maintains a vacuum within the entire process. Controlled offgas recirculation about the ID fan 42 may be employed to achieve the approximately 8 to 1 turndown ratio experienced during operation of the system 16 while enabling the fan 42 to remain within its operating and control regions. The fan 42 may be of a type resistant to corrosion, and be belt driven to allow the alteration of performance parameters.

After exiting the induced draft fan 42 but prior to reaching the stack 46, the offgases may be tapped via duct 195 and diverted to one of several locations within the system 10, by the recirculation systems, collectively represented as the block 44 (FIG. 1). These systems 44 may include ducts, valves, control mechanisms, sensors, and the like, for recirculating portions of the offgases back to the plasma chamber 20 (via duct 195A), to the feeder system 18 (via duct 195B), and/or around the wet scrubber 39 (via duct 195C).

Discussing the latter two recirculations first, recirculating the offgas back to the feed chamber 48 provides an oxygen depleted sweep gas to help prevent a buildup of combustible gases. Also, increasing the offgas flows during the processing of inert feeds may enhance the operation of downstream components within the system 10, by eliminating the problems associated with high turndown ratios.

Recirculating the offgas around the wet scrubber 39 allows the scrubber 39 to operate in a process with an approximate 8 to 1 turndown. The packed-bed scrubbers 198 have a relatively narrow range of conditions under which satisfactory operation can be achieved. Recirculating offgas around the scrubber 39 allows the scrubber 39 to operate at optimum flow conditions while processing the full range of anticipated feed materials.

As for the recirculating the offgases back to the plasma chamber 20, it is but one method by which the system 10 controls the formation of $NO_x$. By way of background, thermal $NO_x$ is formed when nitrogen and free oxygen are present in the high temperature region of the plasma chamber 20 and, to a lesser extent, the secondary chamber 32. Accordingly, control of thermal $NO_x$ emissions may be accomplished by recirculating the offgas to the plasma chamber 20 as that tends to restrict or reduce the presence of oxygen in the plasma chamber 20.

However, thermal $NO_x$ emissions can also be controlled through (i) the use of methane (natural gas) as a nonselective, noncatalytic reductant, and/or (ii) the use of ammonia as a selective, noncatalytic reductant.

As for using methane in the plasma chamber 20, it is noted that during the processing of low $NO_x$ combustible content materials, the sweep gas in the plasma chamber 20 typically provides enough oxygen to induce excess air conditions. Under excess air conditions, the plasma torch 22 may produce significant amounts of $NO_x$. To control the initial formation of $NO_x$ during the processing of low combustible content materials, methane may be mixed with the recycled offgas stream and injected into the plasma chamber 20. The injection of methane tends to cause the atmosphere in the plasma chamber 20 to become reducing, which substantially restricts or eliminates the formation of thermal $NO_x$. In addition to reducing the amount of oxygen available for $NO_x$ formation, the highly reducing atmosphere produced by the methane tends to reduce any $NO_x$ that does form back to nitrogen.

Where methane and/or ammonia is injected into the secondary chamber 32, the injection typically results in the reduction of $NO_x$ to $N_2$ gas. With the injection of methane, the process may be operated as a nonselective process, i.e., both free oxygen and $NO_x$ are substantially consumed by the reductant. With the injection of ammonia, the process may be operated as a selective reduction, i.e., primarily only $NO_x$ is reduced. The selective reduction process tends to work best in the temperature range of approximately 870 degrees Centigrade so that sufficient energy is available to drive the reaction to completion.

In the nonselective process, the methane is injected into the plasma chamber 20 with up to three seconds of residence time. This nonselective process may be particularly applicable when treating only noncombustible waste. The noncombustible waste typically does not contain sufficient organic material to generate a reducing environment in the plasma chamber 20 from the pyrolysis of the waste. Therefore, by adding methane as a $NO_x$ reductant, a reducing environment is created when desired. In addition, the treatment of all inorganic waste results in lower offgas flow rates through the system 10. Although the effect may be relatively small, this lower offgas flow rate can adversely affect the performance of some offgas components. Therefore, by adding the extra air in the secondary chamber 32 to burn the methane, additional offgas is generated and the required turndown ratio of downstream equipment is reduced.

In the selective process ammonia is injected approximately half way down the secondary chamber 32, e.g., through the port 212. The high secondary chamber 32 temperatures and the selective reduction action of ammonia combine to provide favorable reaction kinetics for converting the $NO_x$ back into the nitrogen.

Accordingly, recirculating a portion of the offgas back to the plasma chamber 20 aids in controlling the gas compositions, i.e chemistry, within the plasma chamber 20. It may also provide higher flows through the chamber 20 during inert waste processing and help premix the methane for $NO_x$ control. Because one of the principal concerns with respect to the gas chemistry control within the plasma chamber 20 is for the control of $NO_x$ formation, the system 10 enables the recirculation of the offgas back to the plasma chamber 20 to reduce the concentration of oxygen within the high temperature region of the plasma arc, where the majority of the $NO_x$ formation occurs. The addition of methane to the plasma chamber 20 recirculation stream will further intensify this effect, in addition to methane's action as a nonselective noncatalytic reductant for $NO_x$.

Summarizing the air pollution control system 16 and its process, the induced fan 42 draws the offgas from the secondary chamber 32 through the air pollution control system 16, which includes the evaporative cooler 34 and fabric filter pulsed-jet baghouses 36. The baghouses 36 are followed by the HEPA filters 38 and then the wet scrubber 39. Following the scrubber 39, the offgas is demisted by demister 40 and then the offgas is reheated by the reheater 41. Prior to reaching the stack 46, the offgas is tapped by the recirculation systems 44 for reduction of nitrogen oxides. Moreover, methane or ammonia may be injected into the chambers of the melter system 14 for control of nitrogen oxides.

Figure 10:
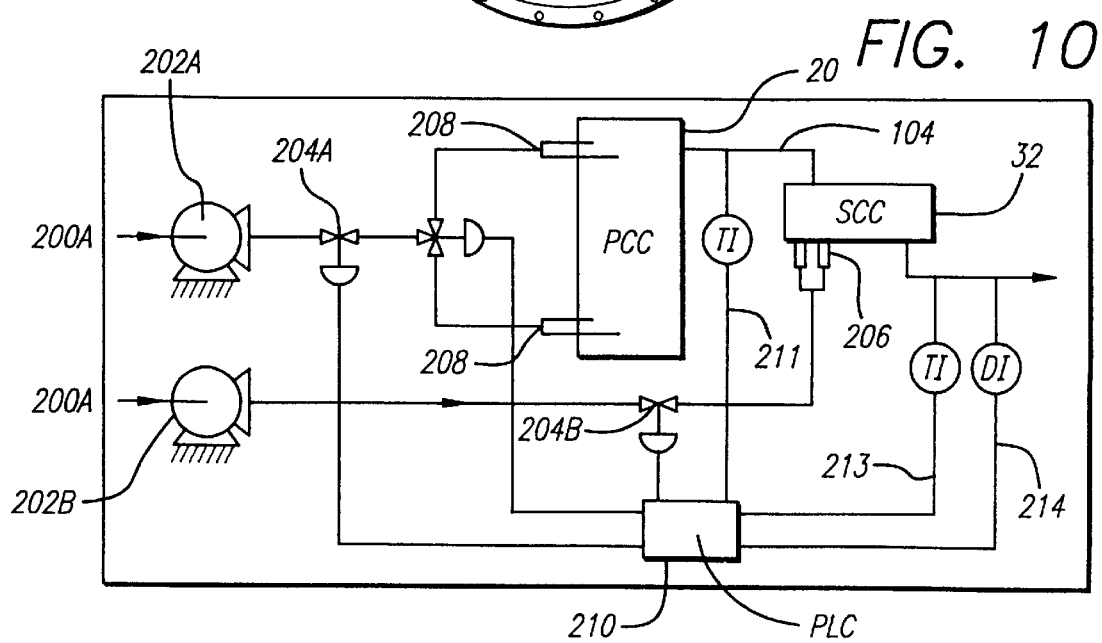
FIG. 10 is a schematic view of an reactant air supply system for use in the invention

As for supplying reaction air into the system 10, to assist in the processes of the plasma chamber 20 and the secondary chamber 32, reference is made to FIG. 10. The system 10 provides flexibility and control over the atmosphere within the plasma chamber 20 through the reaction air supply system 200. A defined total amount of air is supplied to the plasma chamber 20 based on the stoichiometry of the waste materials. However, the split of the air between the upper and the lower levels within the plasma chamber 20 is controlled by the operator via the reaction air supply system 200. By changing the air split and modulating the amount of oxygen deficient recycled offgas into the lower portion of the plasma chamber 20, the operator can control the amount of oxygen contacting the high temperature plasma arc, control the relative oxygen concentrations in the upper and lower portions of the chamber 20, and/or control the amount of forced convection cooling of the melt pool.

In particular, controlling the oxygen concentrations and the relative gas flow rates in the upper and lower sections of the plasma chamber 20 benefits the system 10 by, e.g., allowing operator shifting of gas flows between the upper and lower sections to control gas/solid contact, to moderate the forced convention cooling effect on the melt and reduce particulate entrainment, to reduce $NO_x$ generation rate, to alter the reaction zone within the plasma chamber 20, to control the oxidizing or reducing character of the plasma chamber gases, and to enable the introduction or utilization of emission control materials or techniques in the upper portion of the plasma chamber 20.

As shown in FIG. 10, the reaction air supply system 200 includes two separate systems 200A and 200B: one each serving the plasma and secondary chambers 20 and 32. Each air supply system starts with a blower 202A and 202B feeding a common manifold (header) 204A and 204B supplying the respective chambers 20 and 32. For the secondary reaction chamber 32, the header 204B feeds four tangentially oriented ports 206 located in a ring immediately in front of the secondary chamber inlet 104 (FIG. 2). For the plasma chamber 20, the header 204B splits into two separate reaction air supplies 208, one feeding the upper section and the other the lower section of the plasma chamber 20. The total amount of the reaction air being sent to the plasma chamber 20 is primarily controlled as a function of the plasma chamber 20 exit temperature by a main programmable logic controller (PLC) 210, via line 211. However, the secondary chamber 32 exit temperature and oxygen content may also contribute to the primary air control signal via lines 213 and 214, respectively. Although the recycled offgas flow and the air split between the upper and lower levels in the plasma chamber 20 are individually controlled by the operator, the secondary chamber 32 air flow is controlled by the PLC 210 as a function of the secondary chamber exit temperature and oxygen content.

Moreover, it is noted that the system 10 also facilitates treatment and management of secondary wastes. With the system 10, the secondary wastes may include: (I) collected particulate (such as those collected or trapped in the flyash and spent baghouse bags or HEPA filters)—some radionuclides present in the wastes are evolved into the offgas stream and are collected as particulate; and (ii) salts (from chlorides and other halogens) that are associated with the treatment of acid gases. With respect to treatment of the particulate, the flyash and spent bags and filters may be manually repackaged in drums 12R (FIG. 1), with or without additives, for retreatment in the plasma chamber 20. And because the offgas is maintained at a temperature above the dew point of acid gas components (e.g., approximately 140 degrees C. for hydrogen chloride), the particulate collected in the flyash and spent bags and filters is substantially free of the chlorides and halogens. Thus, when the flyash and spent bags and filters are retreated in the plasma chamber 20, these items (along with any radionuclides) are substantially incorporated into the slag phase 109 of the molten bath.

While the flyash and the spent bags and filters are relatively free of chlorides and halogens for the reason explained above, these latter elements are present in the offgas and are subsequently removed by the packed bed scrubber 39 as primarily being collected in the sump 199. However, because the particulate, especially radionuclides, have already been removed by the baghouses 36 and the HEPA filter bank 38, the chlorides and halogens removed by the scrubber 39 may be managed as nonradioactive or low-level radioactive waste depending on regulatory definitions.

Accordingly, by substantially separating the particulate from the chlorides and halogens, the system 10 improves management of the secondary waste streams.

The invention thus provides methods and system for treating hazardous wastes in which the waste is fed in drums into the system in a steady and controllable manner. It further tends to obviate the need for shredding or pre-sorting of the waste drums. The system separates the waste into three products: a clean gas stream releasable to the atmosphere, and slag and metal fractions suitable for permanent disposal, storage, or recycle.

Those skilled in the art may further modify, reconfigure, or improve the system described above without departing from scope and teachings of the invention. For example, the system may be varied to process boxes, cardboard and plastic drums, bulk sludges, slurries, granular and shredded materials. The system may also be varied to use multiple plasma torches or non-transferred plasma torches. Non-transferred plasma torches may also be used to replace the natural gas burners in the primary and secondary chambers. The system may also be varied to use a non phase-separating hearth system, whereby the hearth would remain static and molten materials would be removed as a single residual stream; different types of waste feed systems to handle vastly different waste materials; multiple hearths vertically aligned or situated substantially side by side for multiple simultaneous or extended melting.

Moreover, the air pollution control system may be variously configured as appropriate. For example, where the system employs a dray scrubber, another means may be used to cool the offgas from the secondary chamber 32, followed by additional baghouses and/or HEPA filters. To that end, sodium bicarbonate may be injected as the alkali reagent and any unused sodium bicarbonate, sodium salts, and fly ash would be collected in baghouses having an air-to-cloth radio to 4:1. Collected solids may be transported to a baghouse hopper and recycled back into the sorbent injection system using the dilute phase pneumatic transport system.

The invention is not limited to the exact system and methods set forth herein, but is defined instead with reference to the following claims, along with the full scope of equivalents to which those claims are legally entitled.

What is claimed is:

1. A method for treating waste, the method comprising:
   conveying waste into a waste treatment chamber;
   exposing the waste inside the waste treatment chamber to a temperature sufficient to melt at least a portion of the waste;
   dropping melted waste into a hearth receiving and holding the melted waste and providing in the hearth a first compartment, a second compartment, and an underflow weir therebetween, the first compartment having a first depth for holding melted waste of lesser density and the second compartment having a second depth greater than said first depth for holding melted waste of greater density; and
   further heating the melted waste held by the hearth.

2. The method of claim 1, wherein the conveying waste into a waste treatment chamber includes conveying at least one waste container of the waste into the waste treatment chamber.

3. The method of claim 1, wherein the exposing the waste inside the waste treatment chamber includes exposing the waste to a plasma torch.

4. The method of claim 1, wherein the further heating the melted waste includes:
   exposing the melted waste held by the hearth to a plasma torch; and
   conducting electrical energy between the plasma torch and at least one electrode in electrical contact with the melted waste.

5. The method of claim 4, wherein the further heating the melted waste includes maintaining the hearth substantially static while the electrical energy is being conducted between the plasma torch and the one electrode.

6. The method of claim 1, further including separating the melted waste held by the hearth into at least two fractions: (1) a first fraction having a first specific gravity and (2) a second fraction having a second specific gravity that is less than the first specific gravity.

7. The method of claim 1, wherein the underflow weir provides a passage between the first compartment and the second compartment.

8. The method of claim 6, further including:
   tilting the hearth in a first direction to remove at least a portion of the first fraction from the hearth; and
   tilting the hearth in a second direction to remove at least a portion of the second fraction from the hearth.

9. The method of claim 6, further including tilting the hearth in a first direction to remove at least a portion of the first fraction from the hearth; and tilting the hearth in a second direction to remove at least a portion of the second fraction from the hearth, the second direction being substantially diametrically opposed to the first direction.

10. The method of claim 8, further including pouring the first fraction separately from the second fraction through the underflow weir.

11. The method of claim 1, further including exposing the waste to a heat source to volatilize at least a portion of the waste to produce a waste gas stream.

12. The method of claim 11, further including treating the waste gas stream with air pollution control equipment.

13. The method of claim 8, wherein the tilting the hearth in the first and second directions includes:
   tilting the hearth in the first direction about a first pivot point; and
   tilting the hearth in the second direction at a second pivot point.

14. The method of claim 11, further including cleansing treatment of the waste gas stream.

15. The method of claim 14, wherein the cleansing treatment of the waste gas stream includes exposing the waste gas stream to reaction in a reaction chamber.

16. The method of claim 14, wherein the cleansing treatment of the waste gas stream includes exposing the waste gas stream to particulate filters.

17. The method of claim 1, further including varying air supply into an upper portion and a lower portion of the waste treatment chamber.

18. The method of claim 1, further including providing multiple layers of refractory in the hearth, the layers including brick and/or ram mix refractory.

19. The method of claim 1, wherein the exposing the waste inside the waste treatment chamber is performed under substoichiometric conditions.

20. A method for treating waste, the method comprising:
   conveying waste into a waste treatment chamber;
   applying a plasma torch to heat and volatilize at least a portion of the waste inside the waste treatment chamber;
   moving volatilized waste out of the waste treatment chamber as a waste gas stream;
   treating the waste gas stream with air pollution control equipment;
   dropping melted waste inside the waste treatment chamber into a hearth receiving and holding the melted waste;
   operating the plasma torch to further heat the melted waste held by the hearth;
   separating the melted waste held by the hearth into at least two fractions (1) a first melt fraction having a first specific gravity and (2) a second melt fraction having a second specific gravity less than the first specific gravity of the first melt fraction;
   tilting the hearth in a first direction to remove at least a portion of the first melt fraction from the hearth via a first outlet; and
   tilting the hearth in a second direction to remove at least a portion of the second melt fraction from the hearth via a second outlet.

21. The method of claim 20, wherein applying the plasma torch includes directing the plasma torch to at least two electrodes in the hearth.

22. The method of claim 20, further including maintaining the hearth static prior to tilting the hearth.

23. The method of claim 20, wherein the conveying waste into the waste treatment chamber includes conveying the waste from two different directions.

24. The method of claim 20, wherein the conveying waste into the waste treatment chamber includes puncturing containers containing the waste prior to entrance into the waste treatment chamber.

25. The method of claim 20, further including returning a portion of the waste gas stream to the waste treatment chamber to modify operating conditions in upper and lower portions of the waste treatment chamber.

26. The method of claim 20, further including recirculating a portion of the waste gas stream in the air pollution control equipment to substantially maintain stable operating conditions in the air pollution control equipment.

27. The method of claim 20, and wherein the treating the waste gas stream includes quenching the waste gas stream;
filtering the waste gas stream to remove particulate; and
scrubbing the waste gas stream to remove acid constituents.

28. The method of claim 27, wherein the quenching the waste gas stream includes injecting cooling liquid into the waste gas stream to lower temperature of the waste gas stream.

29. The method of claim 28, and wherein the filtering the waste gas stream includes exposing the waste gas stream to HEPA filters.

30. The method of claim 20, further including providing an underflow weir in the hearth providing a passage between a first compartment with a first depth and a second compartment with a second depth greater than said first depth.

31. A system for treating waste, the system comprising:
a waste treatment chamber;
a waste feed system configured to conduct waste into the waste treatment chamber;
a heat source configured to heat and melt the waste inside the waste treatment chamber; and
a hearth receiving dripping waste melted by the heat source and holding melted waste during additional heating, the hearth including an underflow weir dividing the hearth into a first portion having a first depth for holding melted waste of lesser density and a second portion having a second depth greater than said first depth for holding melted waste of greater density.

32. The apparatus of claim 31, wherein the waste feed system is configured to conduct at least one container of the waste into the waste treatment chamber.

33. The apparatus of claim 31, wherein the heat source includes at least one plasma torch.

34. The apparatus of claim 31,
wherein the melted waste separates into a first fraction of a first specific gravity and a second fraction of a second specific gravity less than the first specific gravity.

35. The apparatus of claim 31, wherein the hearth defines a sloped surface area aligned with the waste feed system.

36. The apparatus of claim 31, further including pollution control equipment configured to treat a waste gas stream of volatilized waste.

37. The apparatus of claim 31, further including a hearth support member positioned proximately below the hearth, the hearth support member housing a tilt mechanism for tilting the hearth and configured to be positionable below the waste treatment chamber.

38. The apparatus of claim 31, further including a tilt mechanism for tilting the hearth.

39. The apparatus of claim 37, further including a collection chamber housing collection vessels, the collection chamber configured to be positionable proximately below the hearth support member.

40. The apparatus of claim 39, further comprising connecting members releasably coupling the waste treatment chamber, the hearth support member and the collection chamber.

41. Apparatus for treating waste, the apparatus comprising:
a waste treatment chamber;
a conveyor configured to conduct waste into the waste treatment chamber;
a heat source configured to heat and melt the waste inside the waste treatment chamber; and
a hearth configured to hold dripping waste melted by the heat source, said waste melted comprising fractions of different densities separated by an underflow weir provided in the hearth;
wherein the heat source includes:
a plasma torch;
a first electrode configured for electrical contact with melted waste held by the hearth; and
a second electrode also configured for electrical contact with the melted waste;
wherein the plasma torch is operable to generate an electrical current between the plasma torch and either of the electrodes.

42. The apparatus of claim 41, further including a torch mounting assembly enabling movement of the plasma torch about three degrees of freedom.

43. The apparatus of claim 42, wherein the torch mounting assembly comprises a servomechanical structure.

44. The apparatus of claim 41, wherein the hearth includes an underflow weir and the second electrode is situated adjacent the underflow weir.

45. The apparatus of claim 44, further including a torch mounting assembly enabling movement of the plasma torch to selectively conduct with either of the electrodes.

46. The apparatus of claim 41, further including a tilt mechanism for tilting the hearth in two substantially opposing directions.

47. The apparatus of claim 46, wherein the tilt mechanism is configured to tilt the hearth in a distinct motion pattern comprising a vertical motion and a tilting motion.

48. A hearth for use in a waste treatment system, the hearth comprising:
a container configured to hold melted waste;
a first electrode configured for electrical contact with the melted waste;
a first outlet;
a second outlet;
an underflow weir in proximity with the first outlet, said underflow weir situated between a first section configured for holding melted waste of lesser density and a second section configured for holding melted waster of greater density; and
a second electrode configured for electrical contact with the melted waste in proximity with the underflow weir.

49. The hearth of claim 48, wherein the container is configured to provide at least one sloped interior surface for receiving drip-melted waste.

50. The hearth of claim 48, wherein the container is configured to provide a raised formation at least substantially encircling the first electrode.

51. The hearth of claim 48, wherein the container comprises multiple refractory linings and a steel outer shell.

52. The hearth of claim 51, wherein the multiple refractory linings include brick and/or ramming mix layers.

53. The hearth of the claim 48, further including a liquid cooled jacket.

* * * * *